US006993004B2

(12) United States Patent
Boys

(10) Patent No.: US 6,993,004 B2
(45) Date of Patent: Jan. 31, 2006

(54) METHOD AND APPARATUS FOR PRACTICING IP TELEPHONY FROM AN INTERNET-CAPABLE RADIO

(75) Inventor: Donald Robert Martin Boys, Bella Vista, CA (US)

(73) Assignee: Sound Starts, Inc., Aromas, CA (US)

( * ) Notice: Subject to any disclaimer, the term of this patent is extended or adjusted under 35 U.S.C. 154(b) by 974 days.

(21) Appl. No.: 09/906,631

(22) Filed: Jul. 16, 2001

(65) Prior Publication Data

US 2002/0001303 A1    Jan. 3, 2002

Related U.S. Application Data

(63) Continuation-in-part of application No. 09/182,950, filed on Oct. 29, 1998.

(51) Int. Cl.
    H04Q 7/24        (2006.01)
(52) U.S. Cl. .................... 370/338; 370/352; 455/345
(58) Field of Classification Search ........ 370/352–356,
       370/389, 338, 349, 401; 709/217, 219, 231;
       704/260, 243, 275; 707/10, 3; 455/445,
                                        455/344, 345, 346
    See application file for complete search history.

(56) References Cited

U.S. PATENT DOCUMENTS

| 5,884,262 | A |   | 3/1999  | Wise et al.                |
|-----------|---|---|---------|----------------------------|
| 5,905,865 | A |   | 5/1999  | Palmer et al. ...... 725/112 |
| 5,974,043 | A |   | 10/1999 | Solomon                    |
| 6,009,469 | A |   | 12/1999 | Mattaway et al.            |
| 6,012,086 | A |   | 1/2000  | Lowell ............... 709/218 |
| 6,018,710 | A | * | 1/2000  | Wynblatt et al. ...... 704/260 |
| 6,055,566 | A |   | 4/2000  | Kikinis .............. 709/219 |
| 6,249,810 | B1 | * | 6/2001 | Kiraly ............... 709/217 |
| 6,349,329 | B1 |   | 2/2002 | Mackintosh et al. ...... 709/219 |
| 6,389,010 | B1 |   | 5/2002 | Kubler et al.              |
| 6,654,367 | B1 |   | 11/2003 | Kaufman .............. 370/356 |
| 2002/0059592 | A1 | * | 5/2002 | Kiraly ............... 725/37 |

FOREIGN PATENT DOCUMENTS

| EP | 0848373 A   | 6/1998 |
| EP | 0863641 A   | 9/1998 |
| WO | WO 98/30008 A | 7/1998 |
| WO | WO 99/38266 A | 7/1999 |
| WO | WO 00/27135 A | 5/2000 |
| WO | WO 01/05078 A | 1/2001 |
| WO | WO 01/65822 A | 9/2001 |

OTHER PUBLICATIONS

U.S. Appl. No. 09/182,950, Donald Robert Martin Boys.
DD# 445824, Donald Robert Martin Boys, filed Oct. 7, 1998.

* cited by examiner

Primary Examiner—Ajit Patel
(74) Attorney, Agent, or Firm—Donald R. Boys; Central Coast Patent Agency, Inc.

(57) ABSTRACT

An Internet radio device is provided, having a dedicated Internet Protocol (IP) telephony mode for practicing telephony and for enabling one-touch initiation and call connection of an IP telephone call to a recipient device. The internet radio comprises, an IP telephony software application for enabling IP telephony, a modem for accessing and connecting to a data-packet-network, a sound circuitry for facilitating audio conversion and transmission, and a programmable array of input indicia for enabling one touch initiation and connection of an IP telephony call operating in the telephony mode. When a user selects the IP telephony mode IP telephony calling is enabled wherein the user may activate a pre-programmed indicia for the purpose of initiating and establishing an IP telephony call to an intended recipient device.

6 Claims, 12 Drawing Sheets

METHOD AND APPARATUS FOR PRACTICING IP TELEPHONY FROM AN INTERNET-CAPABLE RADIO

CROSS REFERENCE TO RELATED DOCUMENTS

The present invention is a continuation in part to a U.S. patent application Ser. No. 09/182,950 entitled "Mobile Wireless Internet Portable Radio" filed on Oct. 29, 1998, disclosure of which is incorporated herein in its entirety by reference.

FIELD OF THE INVENTION

The present invention is in the field of apparatus for receiving Internet Multimedia broadcasts including live broadcast audio and pertains more particularly to methods and apparatus enabling an IP telephony capability in a programmable and one-touch manner in an Internet capable radio.

BACKGROUND OF THE INVENTION

The World Wide Web (WWW), known as a subset of the well-known Internet is, at the time of this writing, the most accessible worldwide public information network. By accessing the Internet via a personal computer or other Internet-capable computerized appliance, one may obtain knowledge from virtually any network-connected source on Earth. Businesses, cultural centers, libraries, governments, cities, states, and private individuals maintain information pages, termed WEB pages in the art, that are stored on computers (file servers) that are adapted and dedicated to delivering such pages on request.

These WEB pages are typically written in hyper-text mark-up language (HTML) and contain various forms of embedded interactive links, termed hyper-links in the art, created by authors using special software tools adapted for providing such content. Hyper-links are typically gateways to other parts of the page accessed, another page on the same server, or a page on another server. From such a server one may download much information, including software and in some cases other multimedia content, to an Internet connected computer or appliance.

Among the types of media content one may find and access when browsing WEB pages, live audio and video is one of the most recently developed. Through the use of a browser (navigator) and additional software of the form of a multimedia player installed on one's PC or appliance, one may play audio, video, or a combination of the two while connected on-line and visiting a hosted WEB page. Connection to such broadcast servers, as they are termed in the art, typically result from interaction with an embedded hyper-link in the form of a graphic icon somewhere on a hosted WEB page, typically by means of a computer's pointer device.

Recently, traditional broadcast entities such as news, radio, sports networks, and the like have engaged in maintaining WEB pages wherein 24 hour live-streaming audio and video of real-time broadcasts and the like is made available to the general public through hyper-links to broadcast servers. By clicking on a provided hyper-link, one may connect to a server and monitor a particular offered broadcast if the user has an appropriate player for playing the downloaded stream.

While video portions of such live Internet broadcasts generally leave much to be desired in terms of quality due to (at the time of this application) limited bandwidth, audio streams can be heard with adequate quality on most personal computers operating standard modems and having standard line connection to the Internet. Of course, available bandwidth plays a major roll in both audio and video quality over a data-packet network such as the Internet. Other factors effecting quality of service include compression techniques, modem speeds, and so on. In current art, anyone with a 28.8 modem and standard Internet connection may listen to broadcast audio with adequate quality and minimum dropout in most instances.

One of the more notable developments in audio broadcasting over the Internet involves public and private radio station participation as previously described. For example, currently there are a variety of radio stations around the world that provide 24 hour broadcasting accessible from the Internet. Moreover, a growing number of Internet-only broadcasters are emerging. Before live broadcasting (streaming) of Internet multimedia, interaction with multimedia content was virtually limited to pre-stored feeds of audio and audio/video content such as interviews, news clips and short music clips.

In light of the above-described technological advances that have been achieved in live broadcast capability over the Internet, wherein any user with a PC and an Internet connection may participate, it is desirable to provide a means whereby mobile users such as a commuter in an automobile may access live Internet broadcasts from inside the automobile via a wireless connection without having to have an expensive multipurpose PC to gain access.

With regard to PC and Internet capability from automobiles, users are conventionally limited to lap-top computers for full multimedia access. Some companies provide Internet access from palm-top computers and cellular phones however the use is typically limited to accessing e-mails, networking with business associates (IP telephony) or the like. Some companies provide Internet access through a wireless PC for the purpose of providing map information for lost or stranded motorists, however such systems are dedicated only for that subscribed service and are limited to providing pre-stored information.

An Internet-capable radio is known to the Inventor and functions as a device emulating an RF radio by way of operation and program function. The radio in a preferred embodiment has a communication port for connection to a modem and a connection function and software for connecting to the Internet upon user initiation while connected to the modem. Sound circuitry is provided for rendering audio data packets received over the Internet as analog audio output, and for delivering the audio output to one or more speaker ports. The radio stores hyperlinks addressing Internet broadcast servers. The hyperlinks are executable through a provided user input adapted to enable a user to select among the stored hyperlinks. Selection of one of the stored hyperlinks by the user input invokes the hyperlink and connects the radio to the server and, in some cases a URL addressed by the hyperlink, initiating thereby an audio data stream as data packets from the broadcast server to the radio. The radio renders the data stream as analog audio output delivered to the one or more speaker ports. The user input in preferred embodiments also has a plurality of pushbuttons associated with hyperlinks, which can be asserted by activating the associated push buttons. In some embodiments a directory server is used for editing user profiles and for programming connected Internet-capable radios.

The above-described device contributes an experience to users in that there are no geographic limitations on listening to favorite radio stations sourced local or far-distant. It has occurred to the inventor that this same concept may be adapted to another medium, that of telephony. Telephony is traditionally practiced using a plain old telephone service (POTS) such as is prevalent in the well-known PSTN network. Computer integration and network bridging techniques, along with the more recent introduction of Internet Protocol Network Telephony (IPNT) applications for computer stations has enabled users to practice telephony in a rather seamless fashion between disparate types of networks. Therefore, a user operating any one of a cellular, POTS, or IP telephony application may call another user regardless of the home network of the device utilized by the call recipient. An Internet user may, for example, place a call that will be connected to a POTS telephone by passing through a bridge between the Internet network and a PSTN, with appropriate data translation taking place.

Integration of telephony still has certain practical limitations. For example, POTS telephones are fixed and cannot be used in a mobile sense. Moreover, long distance rates apply when calling long distance numbers. Cellular telephones are mobile yet are cumbersome and even dangerous to use at times, such as when talking while driving. Laws are being studied to ban cell phone use while driving. Cellular users are, like POTS users, are subject to long distance charges for long distance calls.

IP telephony, unlike POTS or cellular telephony, uses the Internet network and connected sub-networks as a pseudo land line. Therefore, there are few or no long distance charges associated with IP telephony use. In instances where IP telephony calls bridge into other networks such as the PSTN or a cellular network, carriers may charge a modest amount for use of the non-Internet lines or cellular regions. However, IP telephony service providers can distribute telephony servers out to far-reaching locations on the Internet thereby using maximum Internet infrastructure before a call switches into another network as a cellular or POTS call. A problem with current IP telephony is that it is traditionally limited to multi-purpose PC stations connected to the Internet, or to special, computer-enhanced telephones.

It has occurred to the Inventor that providing a second mode to the Internet-capable radio device, wherein one-touch IP telephony may be practiced in a dedicated and mobile sense would alleviate all of the above-described problems or inconveniences associated with the way integrated telephony is now practiced in the art.

What is clearly needed is a dedicated platform for practicing IP telephony from a mobile transport in a fashion as to provide for one-touch connection technology for establishing calls with virtually any other telephony device. Such a platform would enable hands-free mobile telephony practiced by a maximally convenient method with little or no long distance charges incurred for placing long distance calls.

SUMMARY OF THE INVENTION

In a preferred embodiment of the present invention, an Internet radio device is provided, having a dedicated Internet Protocol (IP) telephony mode for practicing telephony and for enabling one-touch initiation and call connection of an IP telephone call to a recipient device. The internet radio comprises, an IP telephony software application for enabling IP telephony, a modem for accessing and connecting to a data-packet-network, a sound circuitry for facilitating audio conversion and transmission: and a programmable array of input indicia for enabling one touch initiation and connection of an IP telephony call operating in the telephony mode.

When a user selects the IP telephony mode IP telephony calling is enabled wherein the user may activate one of the pre-programmed indicia for the purpose of initiating and establishing an IP telephony call to an intended recipient device.

In a preferred embodiment, the data-packet-network is the Internet network accessed by the Internet radio device in wireless communication mode. In this aspect, the recipient device is one of a personal computer, a telephone, a cellular telephone, an IP telephone, or another Internet radio with an IP telephony mode. In one aspect, the input indicia comprise an array of buttons. In another aspect, the input indicia comprise a turn able dial. In still another aspect, the indicia comprise voice-activated selections in memory. Data programmable into the indicia includes names, telephone numbers, and IP addresses. The data programmable into the indicia appears in a display window on the device when one of the indicia is selected and activated or during programming.

In another aspect of the present invention, a system is provided for facilitating IP telephony practiced from an Internet radio device. The system comprises, an Internet radio device having a dedicated Internet Protocol (IP) telephony mode for enabling one-touch initiation and call connection of an IP telephone call to a recipient device, a network access station to a data-packet-network, the station accessible from the Internet radio device, a directory server connected to a data-packet-network for providing telephony and IP routing services, the directory server accessible from the Internet radio device; and at least one distributed IP telephony server connected to the data-packet-network for providing dedicated telephony routing services.

IP telephony calls are placed from the Internet radio device into the data-packet-network through the network access station and are routed over the network first by the directory server and then by the at least one IP telephony server. In a preferred embodiment, the system is implemented on the Internet network. Also, in a preferred embodiment, the recipient device is one of a personal computer, a telephone, a cellular telephone, an IP telephone, or another Internet radio with an IP telephony mode.

In preferred aspects, the Internet radio device is a mobile device operating in wireless communication mode. In one preferred aspect, the Internet radio device emulates an RF radio as a programmable in-dash vehicle component. Also in a preferred aspect, the at least one distributed IP telephony server is located at a geographic point on a network closest to a bridging facility into a disparate network of a call recipient, the location functioning to maximize the use of the IP network infrastructure. In this aspect, the disparate network is one of a cellular telephone network or one of a connection-oriented-switched-telephone network.

In still another aspect of the present invention, a method is provided for placing an IP telephone call from an Internet radio device, the device having a dedicated IP telephony mode for practicing telephony and for enabling one-touch initiation and call connection of an IP telephone call to a recipient device. The method comprises the steps of, (a) establishing a connection from the device to an IP network, (b) activating a mode selection feature to select telephony mode and (c) activating one of a pre-programmed indicia provided on the device, the activated one of the indicia pre-programmed with at least the intended recipient's call data.

In a preferred embodiment the method is practiced in conjunction with the Internet network. In one aspect of the method in step (a) the connection is a wireless connection and is established by powering on a vehicle hosting the Internet radio device. In one aspect of the method in step (c) activation is by pressing one of a button array comprising the indicia. In another aspect, activation is by turning a dial to specific increment, the increments of the dial comprising the indicia. In still another aspect, activation is by voice and the indicia is in memory of the device. In a preferred aspect of the method in step (c) the call data includes one of a cellular telephone number, a connection oriented switched telephone number, or an IP address.

Now, for the first time, a dedicated platform for practicing IP telephony from an Internet radio device in a fashion as to provide for one-touch connection technology for establishing calls with virtually any other telephony-capable device is provided. Such a platform enables hands free mobile IP telephony practiced by a maximally convenient method with little or no long distance charges incurred for placing long distance calls.

BRIEF DESCRIPTION OF THE DRAWING FIGURES

DESCRIPTION OF THE PREFERRED EMBODIMENTS

According to an embodiment of the present invention, a wireless Internet service including a delivery system and an innovative mobile device adapted for receiving Internet broadcasts is provided and dedicated to providing mobile listeners with a capability to listen to live Internet broadcasts.

Figure 1:
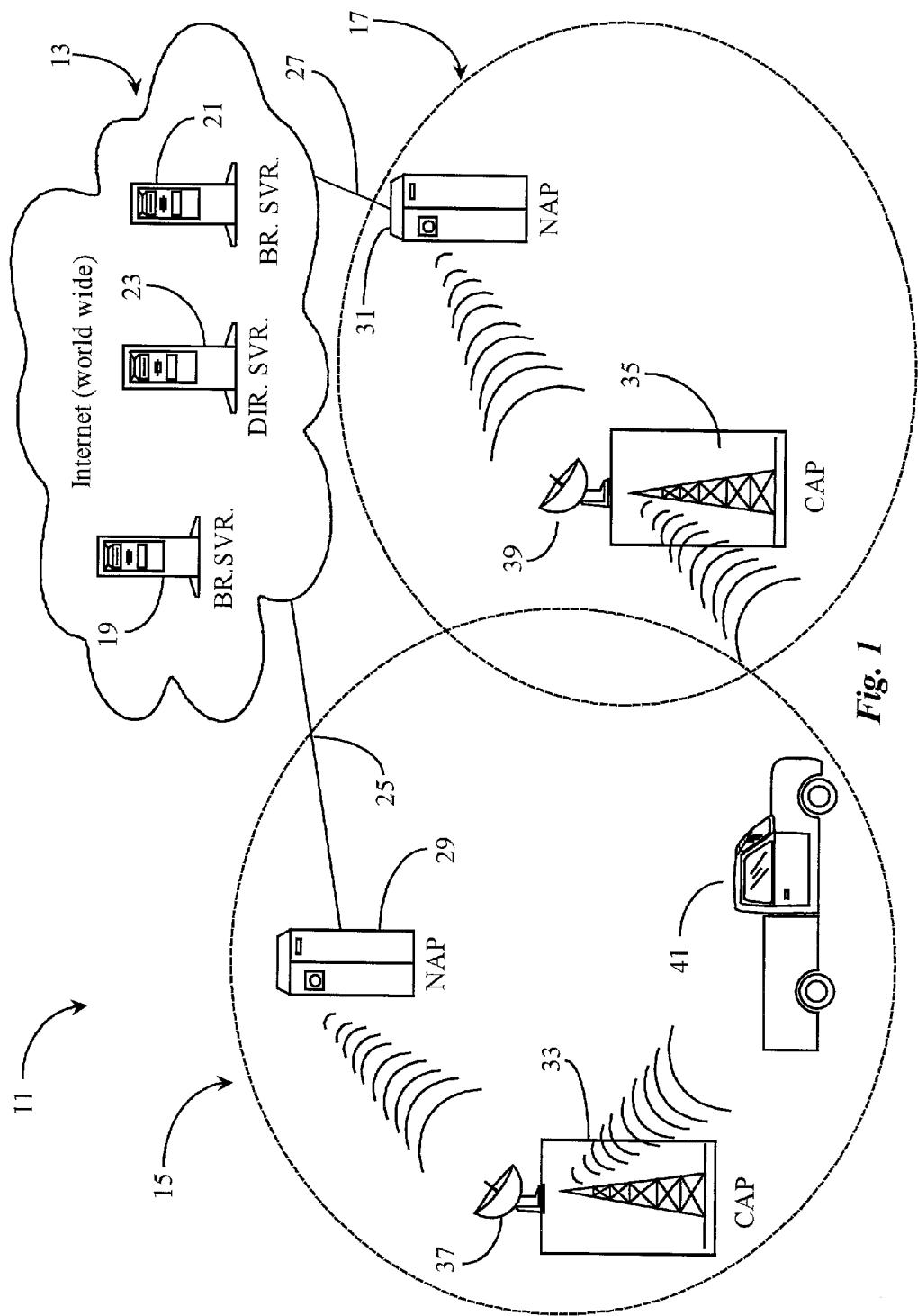
FIG. 1 is an overview of an Internet-connected wireless mobile-radio-broadcast system according to an embodiment of the present invention.

FIG. 1 is an overview of an Internet-connected wireless mobile-radio-broadcast system according to an embodiment of the present invention. A wireless Internet broadcast service 11 is provided and adapted to allow users having an innovative Internet radio device (not shown here but detailed in figures to follow) to connect to the Internet via wireless modem for the purpose of receiving broadcast audio content over a wireless network such as a wireless cellular system. Service system 11 comprises Internet network 13 and overlapping wireless-broadcast regions 15 and 17.

Service system 11 may be of the form of an Internet service using a wireless delivery system to which one may subscribe in order to receive audio broadcasts via the Internet and wireless link from radio stations around the world as well as other audio broadcasts from Internet-based sources. Access to service system 11 is, in a preferred embodiment, achieved via a unique computerized device termed an Internet radio by the inventor because of its dedicated nature. Such a device is not shown here but may be assumed to be present and installed in truck 41, and is described in enabling detail below. This Internet radio device is dedicated to establishing and maintaining a wireless Internet connection and receiving data packets via the wireless connection. More detail regarding this mobile Internet-radio device is provided below.

Internet 13 has connected therein in this embodiment a directory server 23 adapted for storing hyper-links to Internet-connected radio-broadcast servers such as broadcast servers 19 and 21, and to providing access to such broadcast servers upon request. Broadcast servers 19 and 21 are maintained by broadcast radio stations and the like and are adapted to delivering live audio over the Internet, the audio streams delivered typically mirroring the audio broadcast programming the same stations provide by RF multicast. Radio stations comprising music, news, talk, sports and other formats as well as Internet-based broadcasting entities may provide and maintain such connected broadcast servers as servers 19 and 21.

As previously described, service system 11 may use any known wireless delivery system for delivering content to a mobile user such as user 41 (illustrated as a truck having an Internet radio device installed therein). In a preferred embodiment, a well-known cellular service operating under well-known protocols such as cellular digital data packet (CDDP), and advanced cellular mobile services (ACMS) is used because of convenience and already-existing infrastructure. However, in other embodiments, other known wireless delivery systems may be utilized such as electromagnetic spectrum technology or microwave technology. In an alternative embodiment a proprietary wireless network dedicated solely to the purpose of the present invention may also be established. Regions 15 and 17 represent overlapping areas of wireless service such as are known with cellular technology broadcast from distributed stations. The only requirement for a delivery service in the present invention is that the service supports Transfer Control Protocol/Internet protocol TCP/IP (well known Internet transmission protocol), or other known Internet transmission protocols.

Region 15 comprises a network access point (NAP) 29 connected to Internet 13 via a connection line 25, and a customer access point (CAP) 33 which is capable of wireless two-way communication with NAP 29 via a (typically) satellite sending and receiving unit 37. User 41, having an Internet radio device according to an embodiment of the present invention, maintains Internet connection through CAP 33 while in the broadcast region of CAP 33. It will be apparent to one with skill in the art that there will be more than one CAP such as CAP 33 strategically distributed throughout a region such as region 15 than is illustrated herein. The inventor has chosen to illustrate only one such CAP 33 and deems it sufficient for the purpose of adequately explaining the present invention. In actual practice, as is known in the art of cellular service, the number of CAPs such as CAP 33 will define the geographic size of a region, such as region 15 or region 17. Also well-known in the art is the fact that individual regions of coverage of each CAP overlap to provide the extent of the region.

Region 17 comprises components like those illustrated in region 15, namely, a NAP 31 connected to Internet 13 via a connection line 27, and Caps 35 capable of wireless two-way communication via a (typically) satellite sending and receiving unit 39. Region 17 and region 15 are illustrated as overlapping as is consistent with known cellular service regions. In this embodiment, user 41 may leave one region such as region 15 and enter a second region such as region 17 without losing Internet connectivity via known service-connection transfer methods for maintaining connection to a "roaming" mobile user. Connection lines 25 and 27 may be of the form of optical digital carriers, or other well-known data-connection lines.

In a preferred embodiment of the present invention, user 41 subscribes to a wireless service dedicated to maintaining open Internet connections at NAPs such as NAP 31 of region 17. Such a service would use channels dedicated for Internet radios such as one presumed to be installed in the truck driven by user 41. Such channels would not typically be used for telephony or other Internet interaction so that Internet radio devices may be kept economical, compact and dedicated. Internet connectivity is achieved via wireless modem as is known in the art for traditional computers such as laptop or palmtop computers. The architecture and components of the previously mentioned Internet-radio device will be provided in enabling disclosure below.

Figure 2:
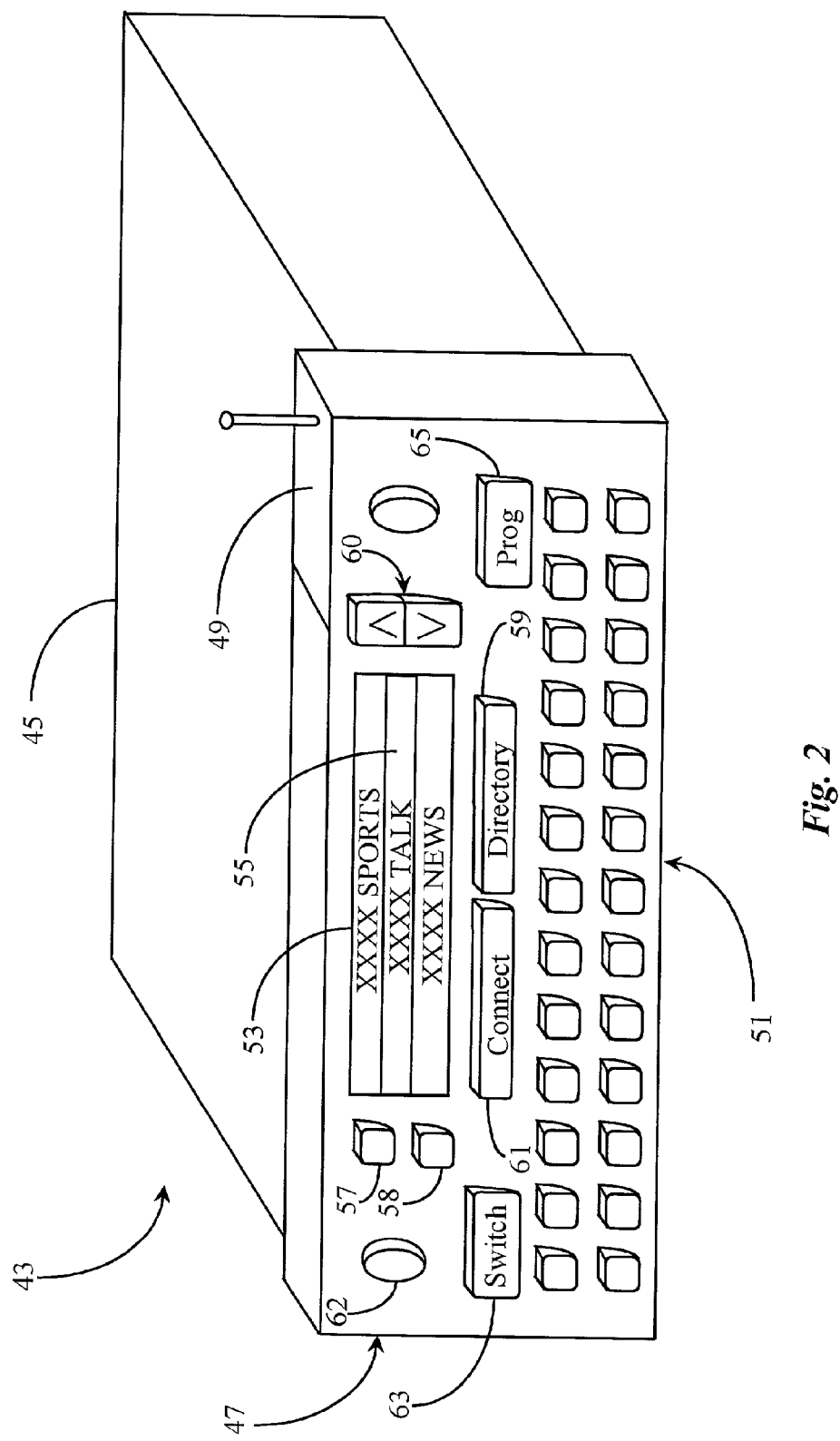
FIG. 2 is a perspective view of an Internet-capable radio device according to an embodiment of the present invention.

FIG. 2 is a perspective view of an Internet-radio device 43 according to an embodiment of the present invention. Device 43 is provided and adapted for the purpose of establishing and maintaining a wireless-mobile Internet connection for downloading live audio from various Internet-connected broadcast servers such as servers 19 and 21 of FIG. 1. Internet-radio 43 comprises a housing 45 and a control-interface structure 47. Housing body 45 is of size and shape to allow for traditional in-dash mounting as is done with AM/FM RF in-dash radios. Control interface 47 comprises various user-accessible controls and is made to be accessible to the user in the same manner as a conventional in-dash radio. In alternative embodiments other mounting techniques may be employed such as above or below-dash mounting.

Internet radio 43 in this embodiment has a suitable display window 53, adapted to providing the user a view of the time and date as well as other information such as displayed radio stations and the like. Display window 53 may be a liquid crystal display (LCD), or another known type of display window. A scroll-up/scroll-down button 60 is provided and adapted for controlling a highlighter bar 55 that may be manipulated up or down to highlight selected stations that may be displayed in display window 53. Three representative radio stations are shown as displayed and viewable in window 53. These are, for example purposes only, XXXX sports, XXXX talk, and XXXX news. The addresses of these and other audio-broadcast sources offering both live and/or stored content are accessible from an Internet directory server such as server 23 of FIG. 1 through Internet connection as previously described. As displayed, the representative radio stations just described are actually hyper-links to broadcast servers such as servers 19 and 21 of FIG. 1.

A wireless modem 49 is provided and configured for Internet access over a wireless network as previously described. In this example, modem 49 is illustrated as built conveniently into Internet radio 43. However, modem 49 may be a separate unit mounted at a convenient location within a vehicle. Modem 49 may, in one embodiment, be activated as soon as a user starts his or her vehicle and power is supplied to Internet radio 43. However in this particular embodiment, a connect button 61 is provided and adapted to activate modem 49 for the purpose of establishing an Internet connection as is known in the art.

A directory button 59 is provided and adapted to initiate contact with a directory server, upon user initiation, which lists available radio-links, such as server 23 of FIG. 1. In a preferred embodiment, connection to a directory server such as server 23 of FIG. 1 would be automatic after establishing an Internet connection. In alternative embodiments a directory server is not required, and a user may program addresses (URLs) directly into the Internet radio. The user can access such URL information from any conventional source. The directory server makes the task easier.

An array of selection buttons 51 is provided and adapted to provide a user with individual one-touch connection capability to individual radio-stations providing content via connected broadcast servers such as servers 19 and 21 of FIG. 1. In this example, there are 26 available selection buttons 51, however, there may be more or fewer such selection buttons without departing from the spirit and scope of the present invention. A program button 65 is provided and adapted for allowing a user to program selected radio stations to each of selection buttons 51 similar to program buttons offered in conventional car radios. URLs (hyperlinks) are stored for preferred stations and associated with buttons 51. Upon user selection the associated URL is asserted, and connection is thus made to the broadcast server having that URL as Internet address, which action immediately downloads the audio stream broadcast by that server.

An instant play button 57 is provided and adapted to allow a user to sample a highlighted radio link such as XXXX TALK which, in this embodiment is highlighted via bar 55. An automatic sample button 58 is provided and adapted to allow a user to initiate a sample sequence wherein each radio link appearing in display widow 53 may be connected to and played for a pre-determined time such as perhaps a few seconds or minutes before moving on to the next available link. This is the familiar scan process used with conventional radios.

Volume and speaker balance buttons 62 (one on each side) are provided for controlling audio parameters such as base, treble, balance, volume, etc. A switch-program button is provided and adapted for the purpose of switching the dedicated function of selection buttons 51 from one-touch radio links to an input-interface-button array for programming parameters into Internet radio 43 such as the date and time, modem numbers, access numbers, protocol preferences, or the like. Numbers and/or symbols (not shown) may be provided on the faces of selection buttons 51 to aid in input function. In one alternative embodiment a user may use this programming feature to program hyperlinks directly into the radio.

According to a preferred embodiment of the present invention, Internet radio 43 is operated much like a traditional car stereo radio in that programming using memory may be accomplished in order to link certain buttons such as selection buttons to various radio links to establish one-touch connection to such links. For example, by connecting to a directory server such as server 23 of FIG. 1 and scrolling through listed station links via scroll panel 60, a user may depress program button 65 when a desired link is highlighted. By subsequently pressing one of selection buttons 51, the desired link is cached in memory and assigned to that particular button. Thereafter, a user may simply press the now-programmed button to establish connection to the desired link.

Radio links are actually hyper-links to broadcast servers such as servers 19 and 21 of FIG. 1, which when activated, cause Internet radio 43 to establish connection to such servers and begin downloading and playing audio content offered in association with that particular server. Internet radio 43 is enabled, by virtue of installed software, to make such one-touch connections which are similar only in appearance of operable method to one-touch radio programming offered in conventional car stereos. Differences are that Internet 43 operates in a switched-data-packet environment instead of broadcast radio-wave frequencies, and that the method of content receiving involves software in addition to wireless receiving capability whereas conventional radios are simply tuned to receive via a radio receiver.

Some of the advantages offered with Internet radio 43 are, that in addition to local stations, Internet radio 43 is capable of playing any broadcast station located anywhere in the world as long as the station in question broadcasts over the Internet. For example, individuals far from home in, for example, a foreign country, may listen to home-town radio in any language desired.

As previously described, Internet radio 43 works with a wireless network such as a cellular network, and a wireless modem such as modem 49 (preferred embodiment). Service system 11 may be hosted by a network provider in cooperation with device manufacturer similar to cell-phone company arrangements. Charges to subscribers may be supplemented by individual radio stations motivated by attracting people into an area or simply by increased ratings. Advertising done by such stations may change to a more national or even a global scope. Moreover, advertising can now be tailored to individuals and groups by demographics rather than all multicast, by virtue of the fact that each user has a unique IP address for selectively receiving packets from the wireless Internet simulcast. Commercials can be substituted, for example, regionally, so a user in San Francisco listening to a radio station in Moscow, Russia, may still get commercials for local San Francisco businesses.

Internet radio 43 has software installed therein for the purpose of enabling Internet connection and downloading and playing broadcast content. More detail regarding such software and enabling circuitry is provided below.

Figure 3:
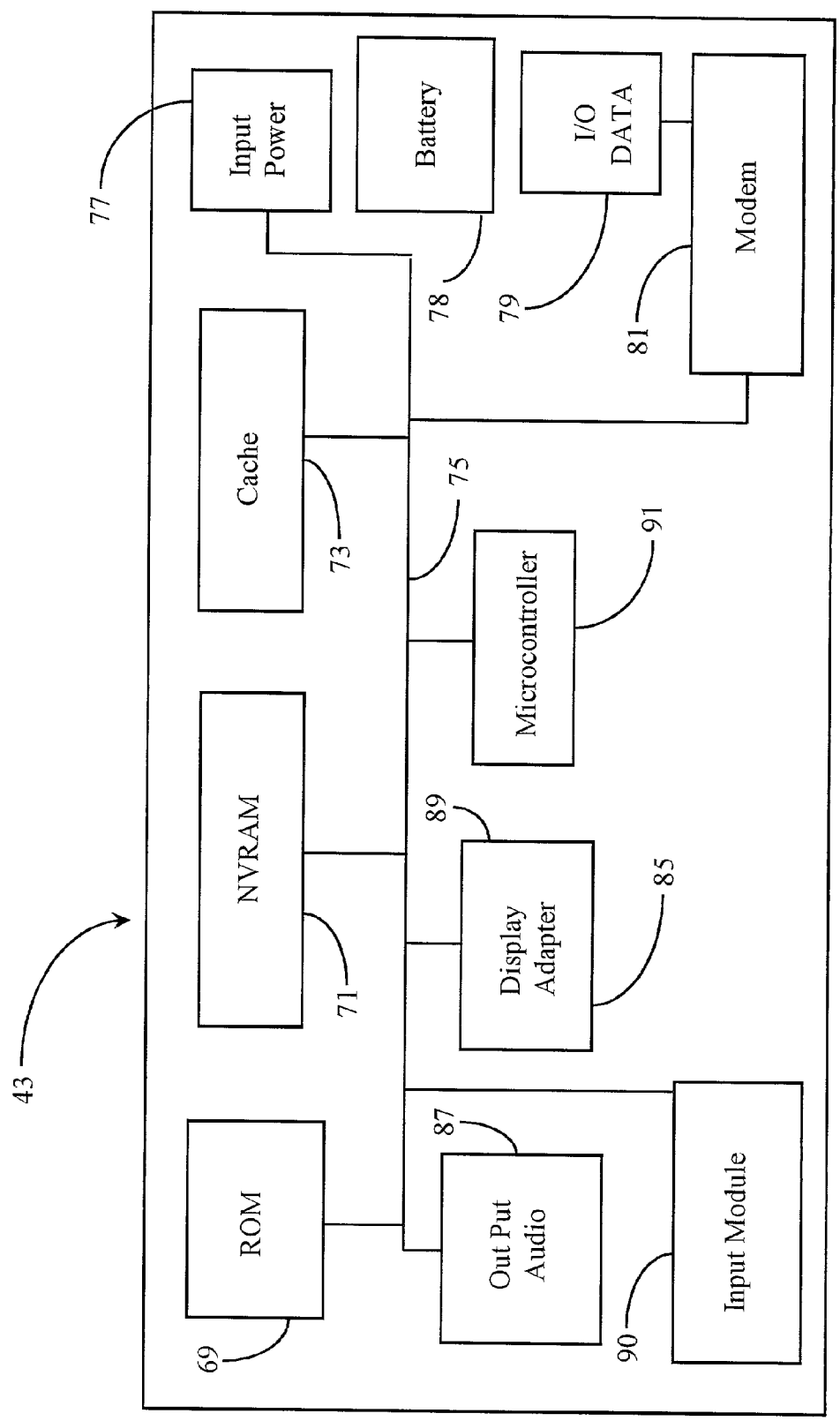
FIG. 3 is a block diagram illustrating internal circuitry of the Internet radio device of FIG. 2.

FIG. 3 is a block diagram illustrating internal circuitry of the Internet radio device of FIG. 2. Internet radio 43, as a dedicated and computerized device, contains certain elements known in the art present in typical computer devices for the purpose of enabling operable function. The inventor intends that the block diagram represented herein be construed as exemplary only with regards to description of such elements as it will be apparent to the skilled artisan that such basic elements are known in the art and common to many differing types of computerized devices, and also that many of the elements can be combined in various ways.

Internet radio 43 has a micro-controller 91 for overall management of Internet radio 43. Micro-controller 91 provides management via a bus structure 75, which may be a simple serial bus, but is preferably a parallel bus structure as known in the art. Also connected to bus structure 75 is a read-only memory (ROM) 69 for containing such as boot instructions and basic operating instruction (BIOS). A non-volatile random-access-memory (NVRAM) 71 is provided and contains such as a compact operating system, an innovative Internet browser application, an audio player application, modem software, and communication protocol software.

A cache memory 73 is provided and adapted to contain such as stored Internet locations (URL's), and other temporary and some semi-permanent information such as accessed and stored radio link locations and radio link locations that may be generic to a browser. In this embodiment, cache 73 may be a browser cache or a shared system cache.

An input power port 77 provides a port for connecting Internet radio 43 to a provided power source, such as the electrical system of a vehicle. A rechargeable battery unit 78 is provided as a secondary source of power so that Internet radio 43 may be operated with the car turned off without using up car battery resource, or to allow the radio to be removed and used outside the vehicle. Connections to battery 78 are not illustrated, but are assumed to be present such as circuitry providing a switch capability between a car battery source and battery 78 as a secondary source. Such circuitry is well-known in the art.

Also connected to bus structure 75 is modem circuitry 81 (analogous to modem 49 of FIG. 2) and an I/O data-modem port 79 (shown connected to modem 81) which contains circuitry required for receiving and sending in wireless mode as previously described. Modem 81 may be built-in (internal) or held separately (external) as previously described.

A display adapter (driver) module 89 is provided and includes circuitry required to operate display window 53 of FIG. 2. An output module 87 is provided and contains circuitry (sound card) adapted to enabling audio to be heard via a connection to speaker units. An input module 90 is provided and contains required circuitry for enabling data input to Internet radio 43 while switched to input mode as previously described with reference to FIG. 2. Display module 89, output module 87, and input module 90 are also connected to bus structure 75.

It will be apparent to one with skill in the art that the internal components of Internet radio 43 as described herein may vary in other embodiments without departing from the spirit and scope of the present invention. For example, some memory may be provided in the form of removable cards as is known in the art. Memory may also be provided in the form of a RAM/ROM mix in addition to NVRAM. Added functions may require additional modular components while an Internet radio of a simplest form may require fewer components. The only requirement for internal architecture is that it contains basic elements that allow for booting the device, and controlling the basic dedicated functions and operations of Internet radio 43.

Figure 4:
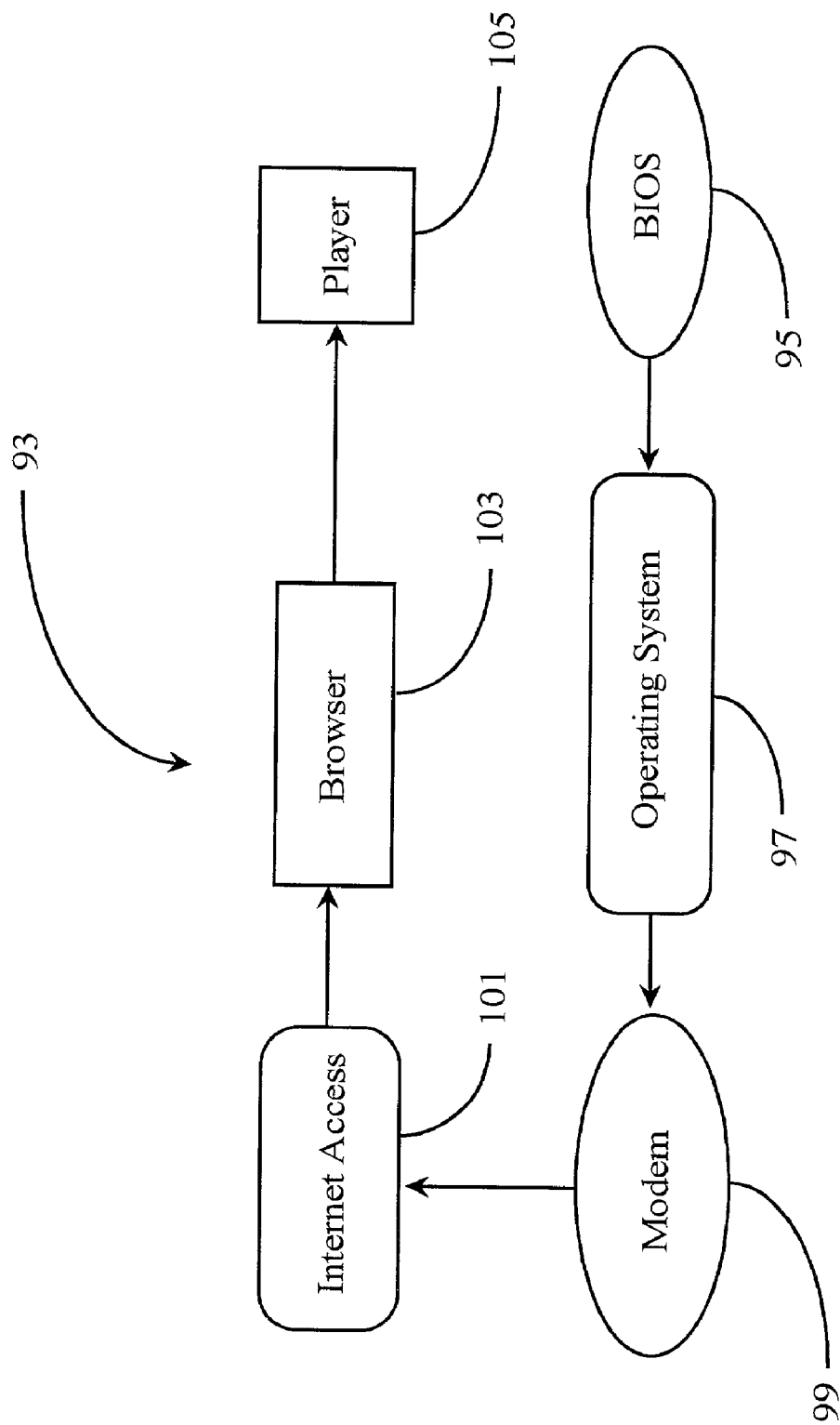
FIG. 4 is a block diagram illustrating software capability of the Internet radio device of FIG. 2.

FIG. 4 is a block diagram illustrating software capability of the Internet radio device of FIG. 2. A software package 93 is provided and adapted for enabling basic function and operation of Internet radio 43 according to an embodiment of the present invention. The inventor intends that package 93 and components thereof be construed as exemplary as other embodiments may contain differing components.

A system BIOS 95 is provided and adapted for booting up Internet radio 43. In this case, BIOS 95 may be very basic in comparison to BIOS systems found in more complex computers having varied functions. BIOS 95, in this embodiment, is limited to booting to a mini-operating system 97. Mini-operating system 97 contains minimum functionality as may be required for operating other dedicated components such as a modem application 99, an Internet access application 101, an audio browser application 103, and an audio player application 105.

Operating system 97 may be a modified (stripped down) version of a known operating system such as Windows CE"!. In another embodiment, operating system 97 may be provided in the form of a new proprietary system dedicated for the purpose of enabling Internet radio according to an embodiment of the present invention. Operating system 97 contains all of the necessary communication drivers and system components needed to work with other installed components according to media and system protocols.

Modem software 99 contains all of the necessary components for operating a modem such as modem 49 of FIG. 1. Modem speeds and other protocols may vary according to implementation and exact model or brand of modem however a minimum modem speed of 28.8 Kps is sufficient for downloading Internet radio. In a simple embodiment, modem 99 is equipped solely for accessing the Internet via wireless mode as previously described.

Internet access software 101 is a basic application that, in one embodiment, may be incorporated or integrated with browser 103. As a basic application, Internet access software 101 provides simple and direct connection to a directory server such as server 23 of FIG. 1, or connection to a service provider. This software may be a stripped down version of known software, or a created module dedicated to the function of the present invention.

Audio browser 103 as described above may be integrated with Internet access software 101. Browser 103 will access Internet sources through URLs, but does not display web pages like conventional browsers. E-mail or news group connections, password routines and typical browser features are not required. The browser's principle function is to contact a directory server such as server 23 of FIG. 1 and to activate a hyper-link (radio-link) thereby causing download and playing of audio content, or, in an alternative embodiment, to directly assert a pre-programmed hyperlink to go directly to audio content at a broadcast server. The only display provided by browser 103 is names of radio-links, or, in some cases pseudo-names, as listed in a directory server. Although this may be loosely construed as a web page, only hyper-links are displayed and not additional media or graphics. Actual downloading procedure may be limited or adjusted as to how many links are displayed at a time. For example, a page containing 200 links may be downloaded and displayed 5 links at a time. In another embodiment, all of the links may be downloaded and displayed in scrollable fashion. Software player 105 may be an existing player (known in the art) or a created player dedicated to playing only audio according to an embodiment of the present invention.

It should be noted here that software package 93 is preferably limited in function so that only components required to achieve the object of the present invention, namely, accessing the Internet for the purpose of downloading and playing broadcast audio content, are included. In this way, memory required to store software package 93 is kept to a minimum. In one embodiment, software package 93 may be provided as a single installable component containing only basic elements of each described sub-component such as browser 103 and so on. In another embodiment, individual components may be provided in separately installable forms.

As memory storage techniques improve and bandwidth capability increases over the Internet, more functionality may be provided to Internet radio 43 such as video capture and play capability. In this case, a more suitable display would be provided for showing video with sound. In this future embodiment, Internet broadcast television may be received in the same fashion as Internet broadcast radio is received according to an embodiment of the present invention. It should be noted here that TV stations are currently broadcasting over the line Internet, however, much more bandwidth is required to achieve a decent dynamic picture. Therefore, the inventor deems that a dedicated Internet-radio device such as Internet radio 43 of FIG. 1 wherein only audio is captured represents the present invention according to a preferred embodiment. That is not to say however, that other embodiments including added function such as e-mail and IP telephony could not be practiced according to other aspects of the present invention.

An innovative function of audio browser 103 involves accessing a hyper-link and activating it with one initiation action provided by a user. This may be accomplished via writing the capability into the browser software. For example, each hyper-link (radio station) has a URL or server address. In an embodiment such as described herein where a directory server is used only radio hyper-links are provided and displayed. Therefore, browser 103 simply follows the link highlighted by the user via a scroll method such as by scroll panel 60 and highlighter bar 55 of FIG. 2. When a user is highlighting a specific link, browser 103 is reading that link. However, after programming all of the radio-links to selection buttons such as described with reference to FIG. 2, one touch to one of these buttons asks browser 103 to find the appropriate link and then to activate it.

This is where cache memory 73 of FIG. 3 comes in to play. Once a link is programmed to a selection button such as to one of selection buttons 51, then a copy of that link is cached in cache memory 73 and listed as assigned to that button. When browser 103 is activated via button selection, it recognizes the link as cached and associated with the particular button. Browser 103 may then contact directory server 23 and subsequently access the appropriate link in that server thereby causing connection to an associated broadcast server such as server 21 of FIG. 1 for downloading and playing the audio stream.

In an alternate embodiment of the present invention, a directory server listing hyper-links would not be required. In this embodiment, radio stations and like broadcasters maintain their own WEB pages with hyper-links to live broadcasts. Of course the same may also be true when using a directory server as access to these links may be made by conventional line equipment such as a personal computer. Directory server 23 merely gathers such links into one location for easy access. If however, no directory server is provided, then browser 103 may be enhanced with a search engine dedicated to isolating WEB addresses that contain these hyper-links. Such WEB page URL's may be displayed in scrollable fashion within window 53 of FIG. 1. Such a page will typically be a WEB page hosted by a particular broadcaster such as a radio station.

When a user highlights a selection via highlighter bar 55 and presses instant play button 57, browser 103 will navigate to the URL and display only the audio hyper-links on that page. For example, if only one hyper-link exists on that page, which is most often the case, then browser 103 will automatically activate that link causing connection to an associated broadcast server for download and playing of live broadcast. If two or more hyper-links to audio content exist on one page, then they may be scrolled and activated as previously described, or sampled one at a time for a predetermined amount of time.

If one link is chosen by a user, for example through activation of program button 65 of FIG. 1, then that link is cached and assigned as before. At this point, a one touch selection may activate that hyper-link as its network path is now known. Moreover, identification and differentiation of audio hyper-links from other server links such as banner adds and the like can be made by browser 103 through an enhancement allowing for identification of code that must be embedded in an audio link for invoking player software. The inventor knows of no such browser with the capability of disseminating or reading embedded code for the purpose of differentiating between separate embedded links.

Figure 5:
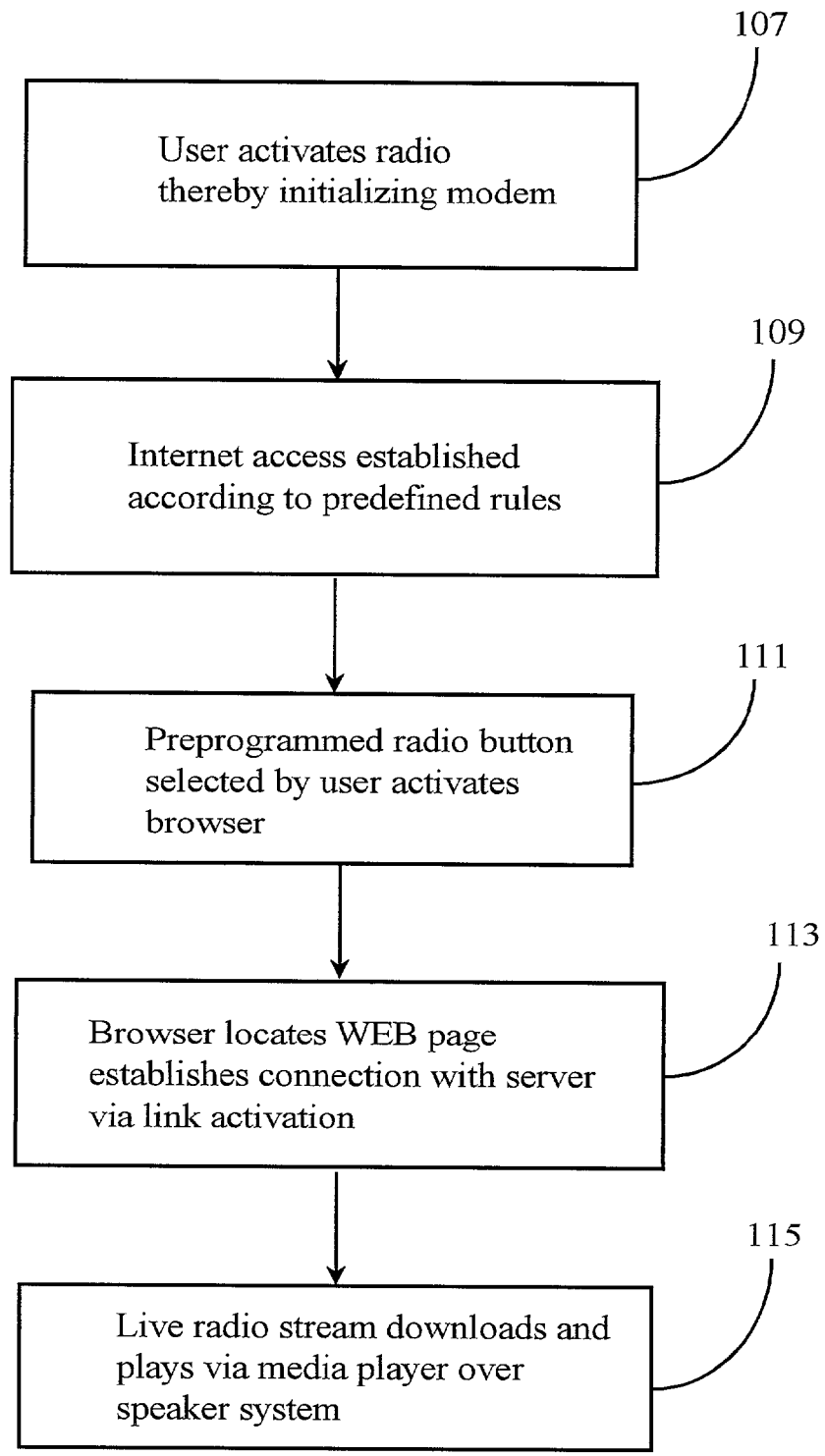
FIG. 5 is a process flow diagram illustrating logical user steps for accessing live Internet radio according to an embodiment of the present invention.

FIG. 5 is a process flow diagram illustrating logical user steps for accessing live Internet radio according to an embodiment of the present invention. In step 107, a user such as user 41 of FIG. 1 activates or powers on an Internet radio such as radio 43 of FIG. 2, thereby initiating Internet connection. Internet connection may be initiated automatically when a user turns on his vehicle, or at the user's discretion such as by activating a connect button such as button 61 of FIG. 2. In step 109, Internet access is established according to pre-defined rules. Access may be through an ISP or wireless network provider.

In step 111, a user may select a pre-programmed button such as one of selection buttons 51 of FIG. 2 to activate a browser such as browser 103 of FIG. 4 for the purpose of acquiring audio content. In step 113, the browser locates the WEB page containing the associated hyper-link and activates the link causing navigation to and download of audio broadcast from an associated broadcast server such as server 21 of FIG. 1. In step 115, broadcast audio downloads to Internet radio 43 and plays over a suitable speaker system.

It will be apparent to one with skill in the art that the above described steps represent a basic example of a sequence of initiation events and automated functions that enable audio content sourced from the Internet to be downloaded and played on an Internet radio such as radio 43 of FIG. 2. It will also be apparent to one with skill in the art that such steps may vary somewhat depending upon user desire and unit capability. For example, instead of selecting a pre-programmed button as in step 111, a user may instead play content via scroll panel and instant play button as described with reference to FIG. 2.

Figure 6:
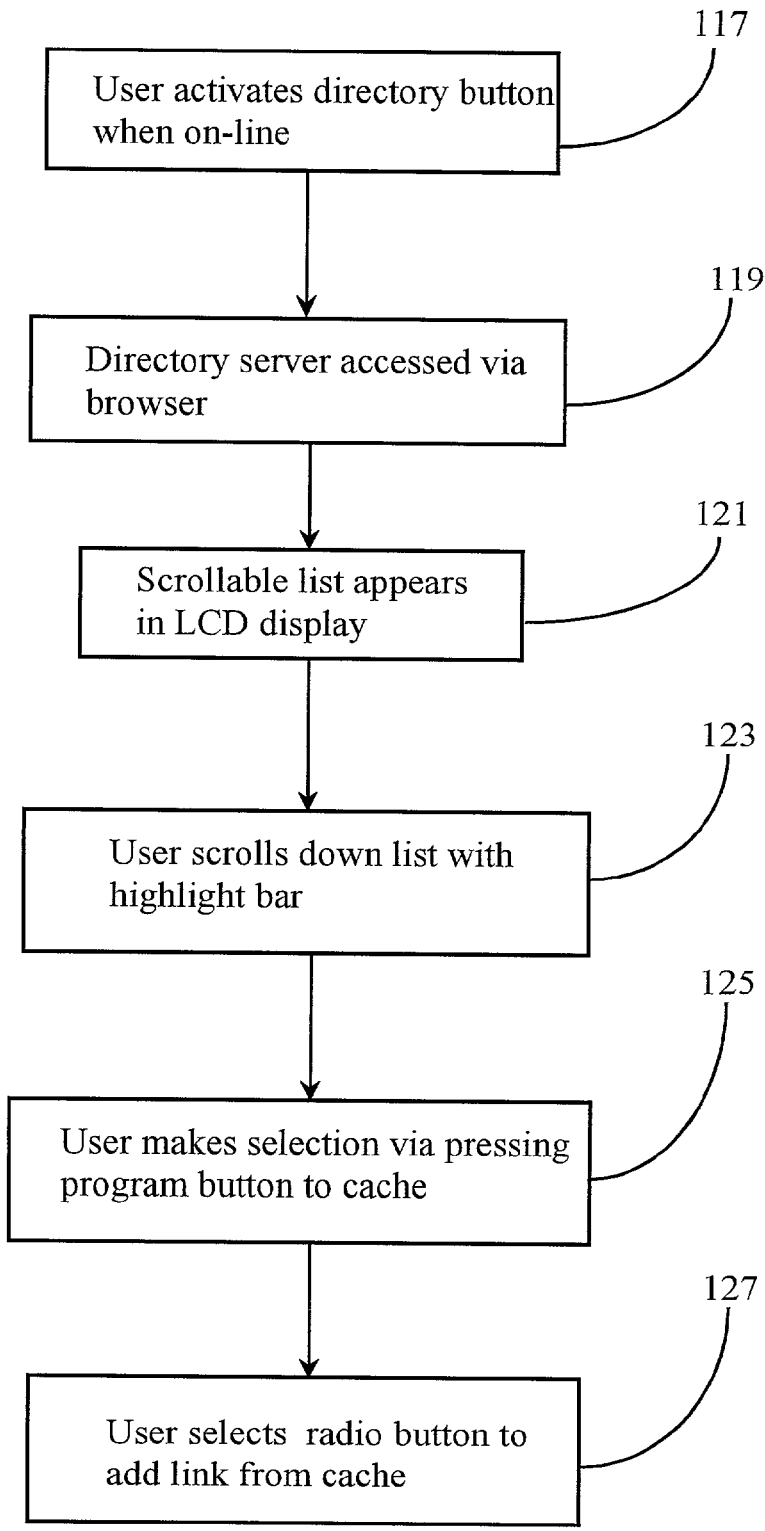
FIG. 6 is a flow chart illustrating programming steps used with the Internet radio device of FIG. 2.

FIG. 6 is a flow chart illustrating programming steps used with the Internet radio device of FIG. 2. In step 117, a user activates a directory button such as button 59 of FIG. 2 while connected to the Internet. This may be automatic in an embodiment wherein a directory server is a first location for a browser. In step 119, a directory server containing hyper-links such as server 23 of FIG. 1 is accessed via a browser such as browser 103 of FIG. 4. The hyper-links may be displayed in step 121. Downloading may progress in incremental units of a total contained on a page such as perhaps 4 or 5 links at a time with a next 4 or 5 links available upon request. In another embodiment, all of the links may be downloaded to Internet radio 43 and be displayed (step 121) in scrollable fashion in a window such as window 53 of FIG. 1.

At step 123, a user may scroll down a list of hyper-links with a highlight bar activated via a scroll panel such as bar 55 and panel 61 of FIG. 2. At step 125 a user makes a selection of a highlighted link via depressing a program button such as button 65 of FIG. 2. This copies the link to a cache such as cache 73 of FIG. 3. At step 127 a user may depress any one of selection buttons 51 of FIG. 2 to assign that button to the cached link. When ready, a user simply depresses the selection button again to go to that server and begin playing the associated broadcast audio.

It will be apparent to one with skill in the art that the above described steps represent just one exemplary programming sequence for an Internet radio such as radio 43 of FIG. 2. Other programming steps or sequences are possible without departing from the spirit and scope of the present invention such as hitting the program button after listening to instant play via button 57, and so on. In addition to programming stations, other content may be programmed into Internet radio 43 such as time and date, perhaps an alarm function, input parameters related to configuration and setup and the like.

In a preferred embodiment of the present invention, Internet radio 43 is intended to be a stand-alone mobile unit for automobiles. The scope of the invention, however, is broader than this one embodiment. For example, an Internet radio device such as device 43 may be provided of the form of a user-worn unit such as a head-set or belt attaching unit. In this embodiment, power would be provided by a compact rechargeable battery pack. In the case of a head-set, the battery pack and control panel may be worn on a belt or body-conforming brace.

In an alternate embodiment, a stand-alone Internet radio device such as device 43 may be provided as a wireless desktop or house system perhaps having a phone jack to enable line connection to the Internet as well.

In still another embodiment of the present invention the Internet radio has no display and operates without benefit of a directory server. In this embodiment the inventor recognizes that it is only necessary that the Internet radio be programmable such that one or more unique hyperlinks are programmed into the radio and associated with an initiation apparatus, so the hyperlinks may be selectively invoked.

There are several ways this programming may be done. The use of a convenient directory server, and user interface apparatus adapted to allow a user to select and initiate hyperlinks and to associate hyperlinks with initiation buttons has already been described above. In an alternative embodiment a portable radio may be provided with a standard serial port, an infra red link, or other known link to a personal computer, such as a laptop or desktop computer. Suitable software may be executed on the computer to access information on the Internet, the information comprising hyperlinks to broadcast servers, and the software may be adapted also to allow a user to associate selected hyperlinks with a selection apparatus on the Internet radio, and to then download the associated hyperlinks to the radio.

In this alternative there is no need for a display. The Internet radio simply has a series of initiation buttons or a dial allowing selective actuation, and a communication port to the host computer. Once selection of hyperlinks is made and downloaded to the Internet radio of the invention, the radio may be used independently, and will tune to the appropriate station each time the selection apparatus is exercised.

In yet another alternative, a user may contact a directory server from his/her Internet-connected general-purpose computer, and provide a client profile. The WEB page interface of the directory server provides the client with a listing of hyperlinks to radio servers, or at least a facility for developing such a list, under the client's control. The client in this embodiment makes selection and association, and the directory server programs the Internet radio itself, the next time the Internet radio accesses the directory server. This provides a particularly simple Internet radio device.

In yet another alternative a call-center technology is used. The user calls an 800 (or similar no-charge number), establishing contact with an agent of the service, and the agent guides the user through set-up. The user can inform the agent of specific desires in radio stations, the agent makes suggestions and provides samples, and the user selects stations and suggests assignment to specific slots at the radio. Once the list is complete, the agent enters the selections and associations in an Internet-connected server, and the next time the user's radio connects, the server programs the radio for the new play mix.

In yet another embodiment the no-charge-to-calling-party number connects the client by phone with an Interactive Voice response unit (IVR), and the IVR elicits the necessary information. Once selection and association is made via the IVR, the IVR automatically communicates same to an Internet-connected directory server, and the server does the rest. The next time the user accesses the Internet the server programs the Internet radio device for the stations and association.

In still another embodiment, an Internet radio such as radio 43 may include a means for recording Internet content such as via write-able CD-ROM or via tape recording deck. In a considerably more complicated embodiment AM/FM receiving capability may be added to the circuitry of Internet radio 43 for the purpose of creating a dual-purpose radio (Internet broadcast and conventional broadcast).

IP Telephony Mode

In another aspect of the present invention, an Internet-capable radio is provided that is programmable in a separate and selected mode for practicing IP telephony in a manner wherein one-touch dialing and connecting to virtually any telephone number or PC address is possible. The method and apparatus of the present invention is described in enabling detail below.

Figure 7:
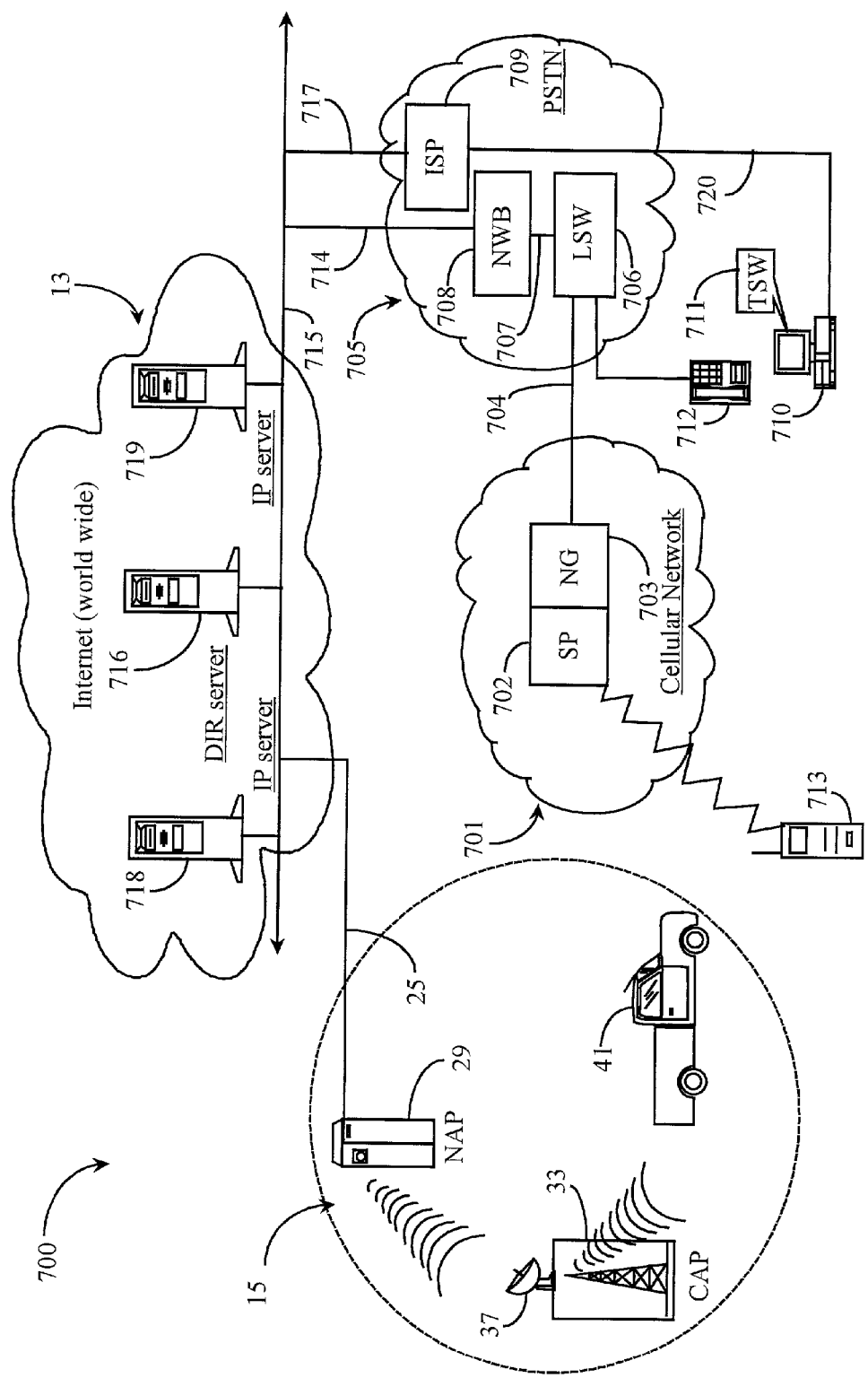
FIG. 7 is an architectural overview of a communication network for practicing IP telephony from an Internet radio device according to an embodiment of the present invention.

FIG. 7 is an architectural overview of a communication network 700 for practicing IP telephony from an Internet radio device according to an embodiment of the present invention. FIG. 7 retains some of the same components that were already described with reference to FIG. 1 above. Therefore, elements included in this example, which have not been modified from descriptions previously provided, retain the same element numbers and are not reintroduced.

Communication network 700 comprises three basic sub-communication networks. These are the Internet network 13, a cellular network 701 and a PSTN 705. Each sub-network in this example is illustrated as a cloud icon and descriptively labeled. A mobile wireless internet-access system and apparatus in this example is illustrated within the realm of wireless service region 15 (dotted circle). As previously described in FIG. 1 above, region 15 comprises a network access point (NAP) 29 which connects to internet 13 via connection line 25, and customer access point (CAP) 33 which communicates with NAP 29 via satellite sending and receiving unit 37. User 41, having an Internet-capable radio, accesses and maintains connection with Internet 13 through CAP 33 while in the broadcast region (15) of CAP 33. It was noted with respect to FIG. 1 that more than one CAP (33) are typically strategically distributed throughout a region such as region 15, and, regions such as region 15 typically overlap within a geographical area, thus enabling a mobile user to "roam" from one region into another without losing Internet connectivity. Connection line 25 may be in the form of an optical digital carrier or of other types of data-connection lines as are known in the art.

In a preferred embodiment of the present invention, user 41 subscribes to a wireless service dedicated to maintaining open Internet connections at NAPs such as NAP 29 of region 15. In this example NAP 29 provides Internet connection with Internet 13 for the purpose of enabling Internet radio as well as IP telephony from an Internet-capable radio with IP telephony capability provided as a selectable mode and presumed to be installed in the vehicle of user 41. Enabling detail of the Internet-capable radio with IP telephony capability is described further below.

Referring now to Internet 13, a simplified representation of IP telephony components comprise a directory server (DIR) 716, two Internet protocol (IP) telephony servers 718 and 719, and an Internet backbone 715. DIR 716 is provided and adapted for enabling user access to local, national, and worldwide listings of phone numbers similar to the well-known printed telephone directories provided by various local telephone companies. DIR 716 also has a similar listing for IP addresses of computer stations connected to the Internet. DIR 716, illustrated in this example as directly connected to backbone 715, represents a first server within Internet 13 that is contacted when using IP telephony mode from an Internet radio device in an embodiment of the invention. It will be apparent to one with skill in the art that there may be more than one DIR 716 provided within Internet 13 without departing from the spirit and scope of the present invention. The inventor illustrates one such server and deems the illustration sufficient for the purpose of explaining the present invention.

IP servers 718 and 719 are provided within Internet 13 and adapted as IP telephony routers. Servers 718 and 719 are illustrated as connected to backbone 715 within the domain of Internet 13. It is important to note herein that in actual practice, there will be many more than 2 IP servers distributed within the domain of Internet 13. IP servers 718 and 719 communicate with each other and with DIR server 716 for the purpose of routing Internet telephony calls using IP data-packet transfer protocols as are known in present art. Depending, of course, on the destination of the user-placed call from vehicle 41, DIR 716 routes the call to an IP server, which is closest in geographical proximity to the intended receiver, thus minimizing use of traditional PSTN and cellular infrastructure and subsequently minimizing user cost in the case of a long distance call.

In this example, IP 718 or 719 enable Internet telephony connection between user 41 and any one of several types of illustrated call-receiving appliances such as a POTS telephone set 712, an IP-enabled PC 710, a cellular telephone set 713, or another IP-enabled Internet radio (only one shown). More detail on the various call-receiving appliances is provided further below. Backbone 715 is intended to represent all of the lines, equipment and connections points that comprise Internet 13 as a whole, therefore there are no geographical limitations to the practice of the present invention.

Referring now to PSTN 705, which is a simplified representation of a Public Switched Telephone Network (PSTN), there are a number of components illustrated therein as follows: a local telephone switch (LSW) 706, a network bridge (NWB) 708, an internet service provider (ISP) 709 and a plurality of connection lines 704, 707, 714, 717, 720, and 721.

Connection line 714 connects backbone 715 of Internet 13 to NWB 708 within PSTN 705. An IP call placed from vehicle 41 destined either for a PSTN recipient or a cellular recipient is routed through CAP 33 and NAP 29, over access line 25 onto backbone 715 and into DIR server 716. From there it is routed, in this example, over Internet infrastructure to IP server 719 (closest proximate server to recipient path). From server 719 the call is routed over data line 714 into NBW 708 wherein the call is converted to a conventional telephony call for PSTN 705 using one of several established protocols such as SS-7, a Bell Core signaling protocol. From NBW 708, the call is routed over telephony line 707 into LSW 706. LSW 706 is adapted as an automatic call distributor (ACD) or other known switch type, which may or may not be CTI-enhanced. In actual practice, there may be more than one PSTN switch in a routing path. From LSW 706, the call may be routed to POTS phone 712 over telephone line 721, or in the case of a cellular destination, over line 704 into cellular network 701.

If an IP call placed from vehicle 41 is destined for PC 710, then it is routed from IP server 719 through ISP 709 over Internet pipeline 717. ISP 709 is adapted as a conventional Internet service provider of which many examples are known in the art. PC 710 is connected to ISP 709 by an Internet access line 720 and has telephony software (TSW) 711 installed thereon, which enables IP telephony. In this example, TSW 711 is analogous to a service application such as Net-To-Phone™, which leverages call bridging capabilities between disparate networks. However, any IP telephony application may be used as long as service points and bridging facilities are available in the infrastructure for bridging calls between networks. The call is then routed from ISP 709 to PC 710 over access line 720, which may be one of several types of physical lines. Examples include Integrated Digital Services Network (ISDN), Digital Subscriber Line (DSL), or even a POTS telephony line.

Referring now to cellular network 710, a simplified representation of cellular service components is illustrated comprising a cellular service provider (SP) 702, a network gateway (NG) 703, connection line 704 as previously mentioned, and cellular telephone 713.

SP 702 is provided and adapted to enable a user to wirelessly-connect to network 701 with, in this example, cellular telephone 713. In an alternate embodiment, other wireless communication appliances such as a palm-pilot may also be used. Wireless connection is accomplished via technology similar to that of user 41 accessing CAP 33 using a wireless network. In a preferred embodiment, the same network architecture may be used to practice receipt of Internet Radio and communication using the IP telephone mode. In one example, this network may also be a cellular-capable network though the IP service utilizes separate components from traditional cellular gateways and the like.

NG 703 is provided and adapted to enable two-way transfer of telephony transmissions between network 701 and PSTN 705 by bridging techniques as are known in the art of cellular telephony. In this example, a user operating cellular telephone 713 typically subscribes to a cellular service and may also, in some cases, have Internet capability as well. In the case of Internet capability, a user operating phone 713 may access Internet 13 through PSTN 705 and components and paths represented therein. Alternatively, there may be a connection (not shown) between NG 703 and Internet backbone 715 through an ISP. The ISP functionality may be part of SP 702.

In this exemplary architecture, bi-directional communication is supported. Not only can user-originated IP calls be sourced from mobile user 41 with target receivers in the internet realm, PSTN realm or cellular realm, IP calls may also originate from the cellular, internet or PSTN realm and be targeted to mobile user 41 as the receiver. Moreover, IP calls may be made between Internet radio users. It is that noted herein user 41 may receive telephone calls while still in Internet radio mode. Selection to IP telephony mode is only necessary for placing calls because of dual functionality of programmed indicia (selection buttons).

Figure 8:
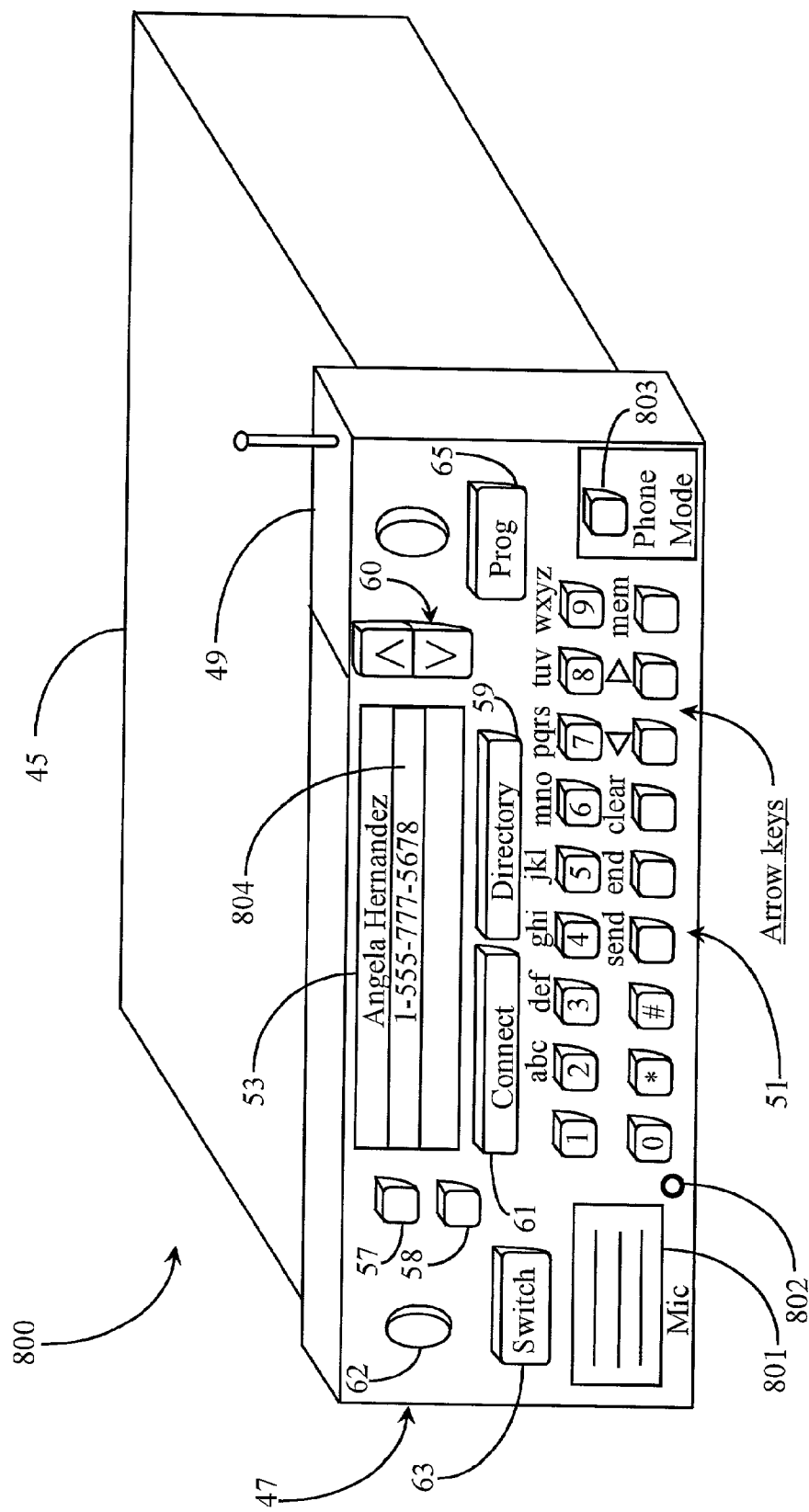
FIG. 8 is perspective view of an Internet-capable radio device with integrated Internet telephony feature controls according to an embodiment of the present invention.

FIG. 8 is a perspective view of an internet-capable radio device with integrated Internet telephony features and controls according to an embodiment of the present invention. It is noted herein that elements included in this figure, which have not been modified from descriptions previously provided with respect to FIG. 2 above, retain the same element numbers and shall not be reintroduced.

An Internet-capable radio 800 is provided and adapted to enable a user to switch between Internet radio mode and IP telephony mode without losing connection to the Internet, and to enable a user to place IP telephony phone calls using a dedicated and programmable "one-touch" method. In addition to the already present features and functions of the Internet radio described with reference to FIG. 2, device 800 provides a programmable one-touch IP number selection and connection interface and a one-touch toggle capability which enables a user to conveniently select IP telephony mode or Internet radio mode.

An IP telephony mode switch 803 is provided and adapted to conveniently enable the toggle capability between IP telephony mode or Internet radio mode with respect to device 800. In this example, the selected mode is that of IP telephony, as is illustrated by the label Phone Mode. To enable outgoing voice data transmission while in IP telephony mode, a microphone (Mic) 801 is provided and adapted to interface with IP telephony software, which is described in more detail further below. Incoming voice data transmission is delivered to the user via the vehicle's speaker system, which is user-controlled with volume and speaker balance buttons 62. For optional audio reception, in a preferred embodiment, a headset jack 802 is provided and adapted to enable headset or earpiece use for incoming audio rather than the vehicle speaker system.

Many other elements in this example have been previously described in FIG. 2 and retain the same general physical characteristics and or function such as housing 45, which is of a shape and size that allows traditional in-dash mounting as is done with conventional vehicle radios, and control interface 47 which comprises various user-accessible controls in an array that emulates those of a conventional vehicle radio, such as selection buttons 51, display window 53 and volume and balance knobs 62. Wireless modem 49 is also provided and adapted in this example for Internet access through a wireless network as previously described and may be activated upon start-up of the vehicle or be activated by use of connect button 61.

Selection buttons 51 comprise, in this example, 18 buttons total, illustrated in a two-row array and labeled in a fashion that emulates the keypads of a traditional telephone and cellular phone, including digits 1 through 0 with corresponding alpha characters, a "star" button, a "pound" button, a "send" button, an "end" button, and a "clear" button. Additional buttons in the lower row are illustrated herein and represented by associated icon as a left arrow key and a right arrow key. A memory (mem) button is also provided in the lower row of buttons and adapted for use in programming the numbered buttons for one-touch dialing and connectivity in the IP telephony mode. It is important to note herein that the array of buttons 51 may total more or less in number than is illustrated in this example without departing from the spirit and scope of the present invention.

In Radio mode, the buttons are associated with Internet radio selection and programming as previously described with reference to FIG. 2 above. Buttons 51 may be activated in conjunction with switch 63, which switches buttons 51 from "use mode" to "programming" mode, thus allowing manual user keypad input to enter names and phone numbers. Program button 65, when activated, allows information to be entered in memory and associated to any one of buttons 51. The previously introduced (mem) button may also provided this function.

In IP telephony mode, selection buttons 51 are programmable for one-touch call initiation whereby a user can program in several frequently used phone numbers or IP addresses assigning individual ones of the addresses and phone numbers to individual ones of buttons 51. Once programmed, a user can emulate a one-button speed-dialing system, which is recognized and available to typical POTS or cellular phone-sets. Also in IP telephony mode, display window 53 displays names and phone numbers rather than radio station hyper-link addresses as was its function in radio mode with respect to FIG. 2. In this example, display window 53 is a 3-line display comprising a name illustrated on one line and a phone number illustrated on a next line. In an alternate embodiment, names and phone numbers may appear together on one line. In still another embodiment, a name and 2 phone numbers or IP addresses or a phone number and an IP address may appear within window 53 using any combination of the 3 lines available.

A highlighter bar 804 serves the same function as bar 55 described with reference to FIG. 2 above. Bar 55 enables scrolling ability within the display window. Scroll up/down buttons 60 are provided and adapted to allow the user to manipulate the highlighter bar 55 up or down as was also described with reference to FIG. 2.

In one embodiment, entered parameters in window 53 may appear during programming to validate a correct entry and again when a user selects a button 51 to place a call. In this way, a user may ensure that he or she is depressing the correct and intended destination number.

Directory button 59 is provided and adapted to initiate contact with DIR 716 previously described with reference to FIG. 7 for the purpose of obtaining telephone directory listing information and, in alternative embodiments, other services. In one embodiment a user may access DIR 716 for telephone directory listing information, which could be visible in display window 53. In this embodiment, a phone number or IP address may be highlighted with scroll control buttons 60, and call-initiated by activating the "send" button of selection buttons 51. In an embodiment wherein a user simply employs one of selection buttons 51 that is pre-programmed with a number or IP address, directory button 59 need not be activated by the user. DIR 716 would in that case provide routing function for the initiated call to the various IP servers (FIG. 7) as previously described with reference to FIG. 7.

Two remaining buttons illustrated on control interface structure 47 of device 800 are instant play buttons 57 and sample button 58, both previously described with respect to FIG. 2 and are for use in Internet radio mode. These two buttons provide functions only utilized by device 800 while in Internet radio mode and are not utilized when device 800 is in IP telephony mode. It will be apparent that addition of Mic 801 and mode selection button 803 has caused the number of selection buttons 51 in this example to be reduced in quantity from the total illustrated with respect to FIG. 2. This is simply a physical restraint of the added physical features in the drawing and not a limiting factor in actual practice as the features may be strategically located elsewhere on the radio.

In one embodiment of the present invention an Internet radio/IP telephony device may be provided in similar fashion as device 800 but with no distinguishable mode between Internet radio and IP telephony capability. In this case, additional selection buttons 51 may be provided and divided according to those used for programming radio stations and those used for programming call data. The provision of two separate modes in this embodiment simply enables a user to make maximum use of all of the indicia provided on the face of Internet radio 800. Also in the case of a single mode operation wherein a user may listen to music and conduct telephony simultaneously, added components dedicated to sound and packet processing are required to enable simultaneous performance.

In a preferred embodiment of the present invention, radio 800 is designed for operation in a mobile wireless environment as a vehicle indash component emulating RF radio. However the method and apparatus the present invention is not necessarily limited to vehicles. For example, a tabletop device or a user-worn device may be provided having the same or similar functionality as device 800. An alternate embodiment, the telephone jack may be provided on device 800 (tabletop radio/phone) enabling device 800 to be used to access the Internet through a telephony network in a wired and semi-fixed sense. There are many variant possibilities.

Figure 9A:
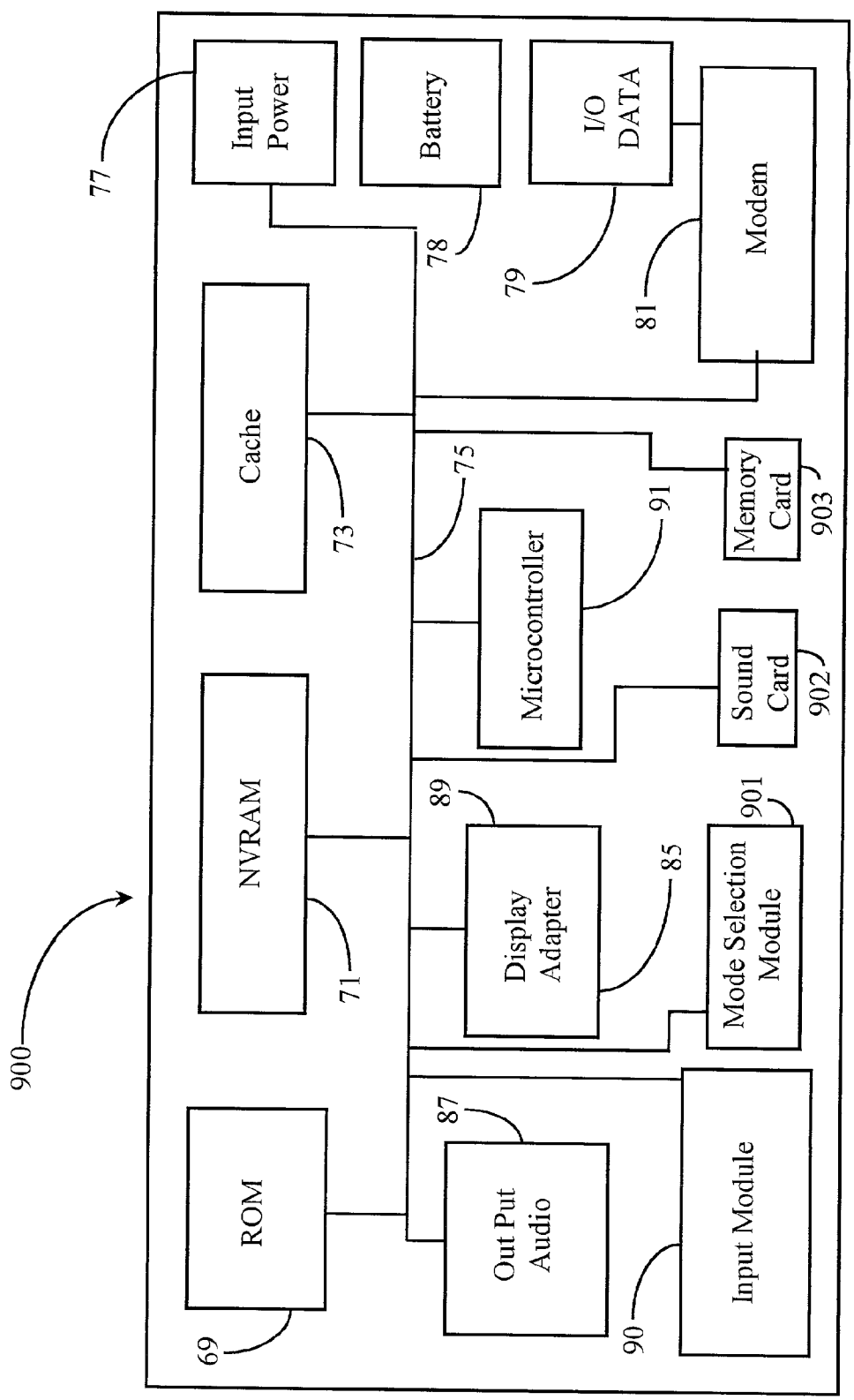
FIG. 9a is block diagram illustrating various hardware components added to the Internet radio enabling use for dedicated IP telephony according to an embodiment of the present invention.

FIG. 9a is a block diagram illustrating various hardware components added to the Internet radio enabling use for dedicated IP telephony according to an embodiment of the present invention. The inventor intends that the block diagram represented herein be construed as exemplary only with regards to descriptions of such elements as it will be apparent to the skilled artisan that such basic elements are known in the art and common to many differing types of computerized devices, and also that many of the elements can be combined in various ways. It is noted herein that elements included in this figure, which have not been modified from descriptions previously provided shall retain the same element numbers and shall not be reintroduced.

A hardware circuitry 900 is provided and adapted to enable the dedicated IP telephony capability of device 800 of FIG. 8 in addition to the Internet radio capability, which has been previously described herein. In addition to existing components previously introduced and described, circuitry 900 comprises a mode selection module 901, a sound card 902, and a memory card 903. Existing components contained herein retain the same functionality as in the previously described Internet radio and comprise ROM 69, NVRAM 71, cache 73, bus structure 75, input power port 77, battery 78, I/O data circuitry 79, modem circuitry 81, out put audio circuitry 87, display adapter 89, input module 90, and micro controller 91. Enabling detail of these existing and unmodified components has been provided above in FIG. 3.

Mode selection module 901 is provided and adapted to enable user-controlled switching of device 800 between Internet radio mode and IP telephony mode. Not illustrated, but presumed to be integral to module 901 include such circuitry as an interface with user-activated phone mode switch 803 of FIG. 8 which allows toggling between the two modes, and an interface with micro-controller 91 which manages and redirects signal processing to the components required for either mode.

Sound card 902 is provided and adapted to enable voice-data reception while in IP telephony mode. Not illustrated but presumed to be integral to sound card 902 include such circuitry as digital-to-analog conversion circuitry enabling digitized voice data to be rendered usable by the analog sound system of a vehicle, and an interface with that analog sound system.

In an alternate embodiment, sound card 902 may be incorporated as part of output audio module 87. Card 902 is in a preferred embodiment, a full-duplex card enabling a two-way, un-interrupted IP telephony connection. In an alternate embodiment, a half-duplex card may be used. Card 902 also interfaces with micro-controller 91 for signal management, and with mic 801 of FIG. 8.

Memory card 903 is provided and adapted to enable user-activated storage of desired information such as names and phone numbers that may later be retrieved and viewed on display window 53 of FIG. 8. Not illustrated but presumed to be integral to memory card 903 include such circuitry as an interface with micro-controller 91 for signal management and an interface with display window 53 of FIG. 8. Card 903 may in some embodiments be separately programmable via insertion into a PC station through an appropriate docking bay adapted for the purpose. In this way, IP addresses and telephone numbers may be simply programmed on the memory whereupon after re-docking card 903 into the Internet radio in IP telephony mode, the assignments will replace the previous one-touch program with respect to buttons 51.

Figure 9B:
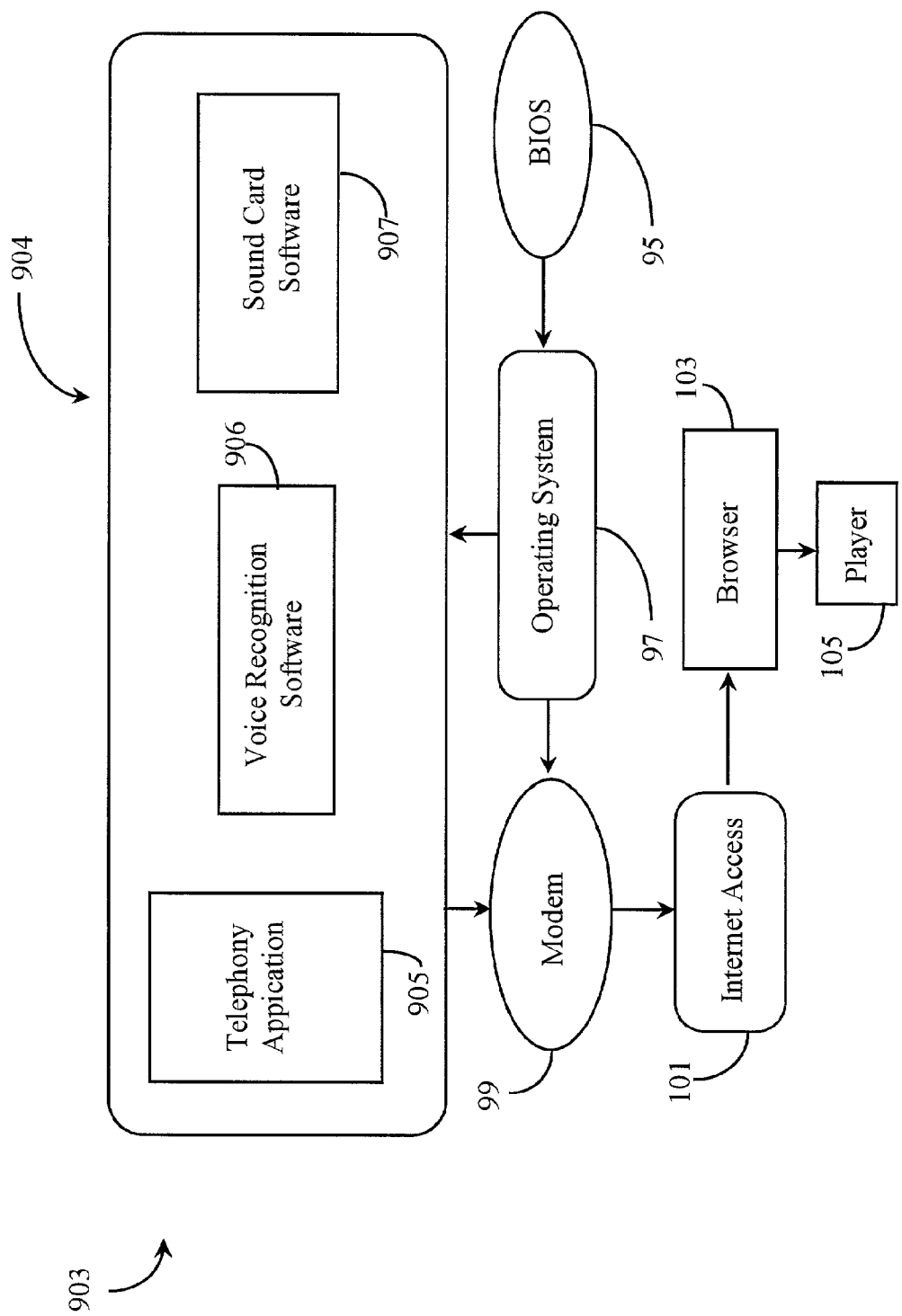
FIG. 9b is block diagram illustrating various software components added to the software of the Internet radio device and dedicated for IP telephony.

FIG. 9b is a block diagram illustrating various software components added to the software of the Internet radio device and dedicated for IP telephony. A software package 903 is provided and adapted to enable IP telephony function in addition to Internet radio function with respect to device 800 of FIG. 8 according to an embodiment of the present invention. The inventor intends that package 903 and components thereof be construed as exemplary as other applicable embodiments may contain differing components. It is noted herein that elements included in this figure, which have not been modified from descriptions previously provided shall retain the same element numbers and shall not be reintroduced.

Software package 903 comprises an IP telephony software block 904 in addition to existing components previously introduced and described. Existing components contained herein retain the same functionality as in the previously described Internet radio and comprise BIOS 95, operating system 97, modem application 99, Internet access application 101, browser application 103 and player application 105. Enabling detail of these existing components and their interaction as indicated by the various illustrated directional arrows has been provided above in FIG. 4.

Software block 904 is provided and adapted to interface with operating system application 97 and with modem application 99 as indicated by the illustrated directional arrows. IP telephony software block 904 comprises a telephony application 905, voice recognition software 906, and sound card software 907. Telephony application software 905 is provided and adapted to enable voice transmission via a user's modem similar to TSW 711 as previously described in FIG. 7 with reference to PC 710. A software application such as Net-To-Phone™, or another known application may be used in this example. A proprietary telephony application specially developed and tailored for the dedicated function of device 800 (FIG. 8) may also be provided and utilized for enabling IP telephony.

Voice recognition software 906 is provided and adapted to enable a user an optional "hands-free" method of programming desired names and phone numbers into the IP telephony device 800 whereby, when in programming mode, a user may input the desired information by speaking the letters and numerals rather than by using the keypad of selection buttons 51 as previously described. In an enhanced embodiment, software 906 enables a user an optional "hands-free" method of selecting and calling a desired party whereby, when in phone mode, a user may speak a simple sentence such as "call Martin at work" which invokes software 906 to initiate a connection via the word "call", to recall all phone numbers associated with "Martin" via the word "Martin", and to select a particular phone number for Martin, in this example his work number via the word "work". In this example, software 906 is illustrated as a stand-alone module, however in an alternate embodiment, software 906 may be incorporated as part of telephony application software 905. In yet another embodiment, software 906 may be incorporated as part of modem software 99. More detail on the programming function is provided further below.

Sound card software 907 is provided and adapted to interface with sound card 902 of FIG. 9a in order to render incoming digitized voice-data into analog transmission. Software 907 in conjunction with sound card 902 also provides other audio tones associated with telephony in general such as a "dial" tone, a "ringing" tone and a "busy signal" tone. Software 907 in this example is illustrated as a "stand-alone" module, however, like software 906 described above, in an alternate embodiment, software 907 may be incorporated a part of telephony application 905, or in yet another embodiment, may be incorporated as part of modem software 99. There are many possibilities.

Figure 10:
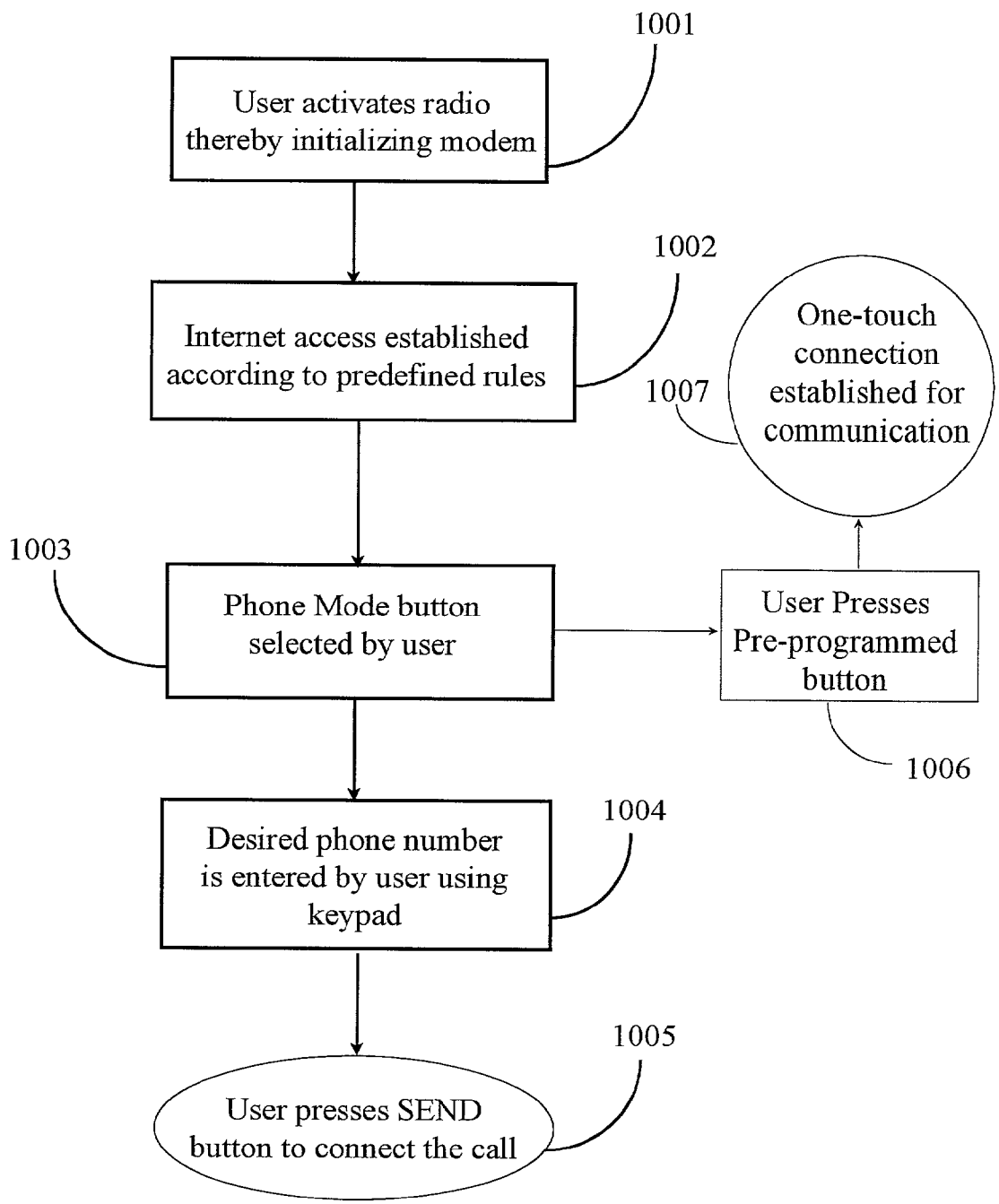
FIG. 10 is a flow chart illustrating user steps for placing an IP telephony call from an Internet-capable radio device according to an embodiment of the present invention.

FIG. 10 is a flow chart illustrating user steps for placing an IP telephony call from an Internet-capable radio device according to an embodiment of the present invention. At step 1001 a user such as user 41 of FIG. 7 activates or powers on an IP telephony internet radio device such as device 800 of FIG. 8 by starting the vehicle thereby automatically initializing the modem or by starting the vehicle and then pressing the connect button 61 of FIG. 8 which then initializes the modem to connect to the Internet. At step 1002, the modem establishes an Internet access connection according to protocols of the hardware and software applications being employed. Access in this example is through a wireless network provider. At step 1003 a user analogous to user 41 of FIG. 7 selects phone mode by pressing phone mode button 803 of FIG. 8. Once in phone mode at step 1003, user 41 now has the option of manual or automatic "dialing" of a desired phone number.

In Manual operation, at step 1004, user 41 (FIG. 7) manually enters a desired phone number by using the selection buttons 51 of FIG. 8. In one embodiment, the numbers being entered appear in display window 53 thus allowing a user to verify the accuracy of the entered number before initiating connection. At step 1005, user 41 presses the "send" key of selection buttons 51 of FIG. 8 to connect the call.

In a one-touch embodiment using pre-programmed numbers or IP addresses, at step 1006 user 41 presses one of selection buttons 51 that has been pre-programmed to initiate an IP call and establish connection with a recipient device associated with the number. At step 1007 user 41 achieves connection with the desired party, having utilized the "one-touch" method of calling.

In a case wherein the user attempts to call an IP-addressed device such as a PC or other TCP/IP enabled device, if the called device is not online, then a message to call back may be left by the system. In some embodiments, a page or other form of notification such as, perhaps a generic service call may be generated and placed to the recipient in another medium so that the recipient may quickly get the message of the call attempt. In one embodiment, the user may invoke the services of DIR 716 of FIG. 7 to provide telephone directory listing information by pressing directory button 59 of FIG. 8, view any provided information in display window 53, scroll and select with highlighter scroll buttons 60, and then press the "send" button to connect the call.

Figure 11:
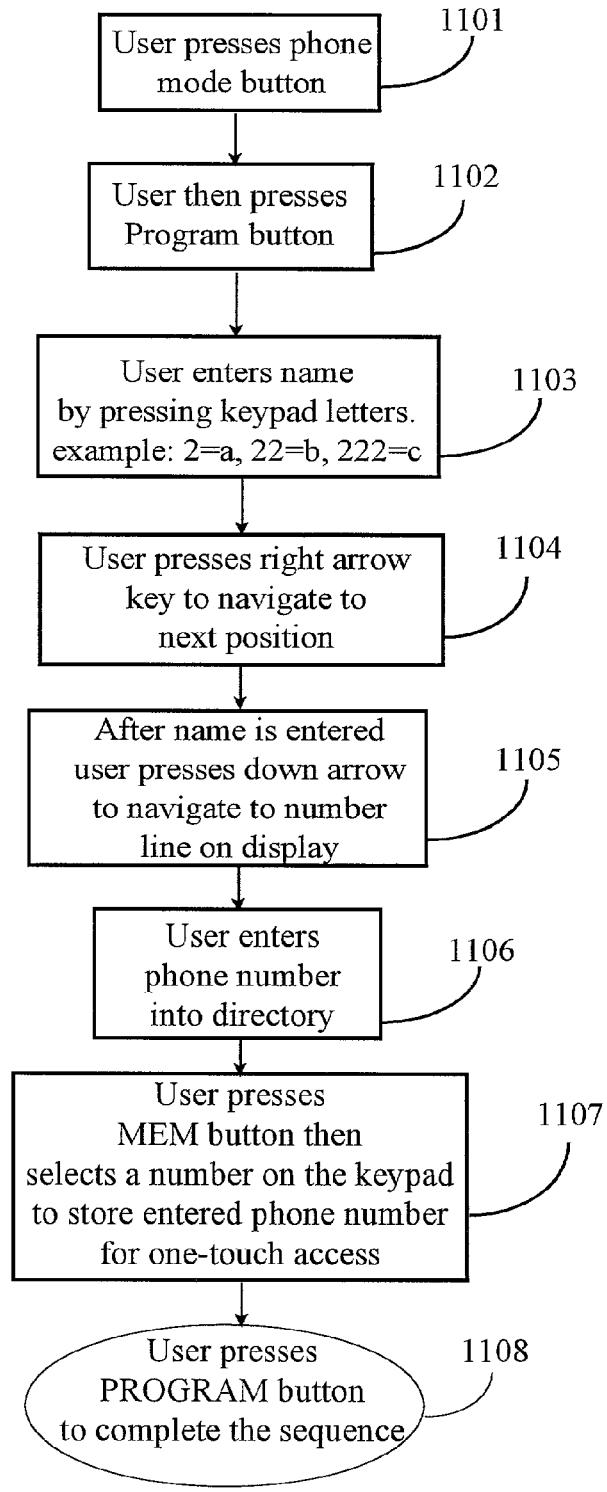
FIG. 11 is a flow chart illustrating programming steps for entering identities and phone numbers into memory for enabling one-touch IP telephony from the Internet-capable radio device according to an embodiment of the present invention.

FIG. 11 is a flow chart illustrating programming steps for entering identities, IP addresses and phone numbers into memory for enabling one-touch IP telephony from the Internet-capable radio device according to an embodiment of the present invention. At step 1101 a user such as user 41 of FIG. 7 selects phone mode by pressing phone mode button 803 of FIG. 8. At step 1102, user 41 then selects program mode by pressing program button 65 of FIG. 8. Device 800 is now in a ready mode to accept alpha character input. At step 1103 user 41 enters an alpha character by pressing keypad buttons of selection buttons 51 of FIG. 8 which correspond to desired alpha characters. For example 6=M, 2=A, 777=R, 8=T, 444=I, 66=N, etc. After entry of the first alpha character, at step 1104, user 41 presses right arrow key of selection buttons 51 of FIG. 8 to navigate to the next alpha position. In one embodiment pressing the left arrow key functions to delete a character that may have been entered in error. User 41 at this point would now return to step 1103 to enter the next alpha character, and continue to loop between step 1103 and step 1104 until the desired name is entered. After the desired name is entered, at step 1105, user 41 presses down-arrow 60 of FIG. 8 to navigate to the number line of display window 53 of FIG. 8. Device 800 is now in a ready mode to accept numeric character input.

At step 1106, user 41 enters a phone number using numeric keypad buttons of selection buttons 51 of FIG. 8. In one embodiment, a dash button may be provided for entering a dash character between numbers. In another embodiment, the dash character may be understood automatically by the system. It is important to note herein that an IP address may also be entered using button array 51. At step 1107, user 41 assigns a memory location to the just-entered data and stores the data there by pressing the "mem" button of selection buttons 51 of FIG. 8 and then by selecting and pressing one numeric key on keypad 51. At step 1108, user 41 presses program button 65 to exit program mode. In a preferred embodiment, function button employed to aid programming are not programmed with telephone numbers or IP addresses. However, this does not necessarily limit the quantity of numbers and/or IP addresses that may be assigned. For example, a user in one embodiment may assign a number or IP address to a two-button combination such that when in use mode simultaneously pressing the two buttons initiates a call. In still another embodiment, a tier navigation button may be provided and adapted to enable a user to access multiple tiers of programmed numbers and or IP addresses. For example, tier 1 could contain ten entries, tier 2 ten entries, and so on. There are many possibilities.

It will be apparent to one with skill in the art that the method and apparatus of the present invention provides a great benefit to mobile users by rendering mobile telephones in automobiles unnecessary, replacing such use with IP telephony, which may be operated by one-touch method or in a hands free environment using voice recognition. Moreover, the unique application of IP telephony in a dedicated mobile interface saves users money in otherwise intractable long distance telephone charges.

The method and apparatus of the present invention may also be provided as a separate and dedicated interface that is adaptable to an Internet radio device or also as a stand-alone device having a separate modem or sharing the same modem. In a preferred application, the Internet radio/IP telephony device provides users with the 2 most popular and marketable mediums of radio (Internet) and telephony (IP) combined in a single and dedicated device.

The method and apparatus of the present invention should be afforded the broadest scope under examination. The spirit and scope of the present invention is limited only by the claims that follow.

What is claimed is:

1. An Internet radio device having a dedicated Internet Protocol (IP) telephony mode comprising:
   an IP telephony software application for enabling IP telephony;
   a wireless Internet connection;
   microphone and speaker apparatus;
   a programmable array of one-touch inputs; and
   a memory card slot and interface for accepting and reading a memory card storing destination addresses for telephone calls to be placed;
   wherein a user may introduce a set of destination addresses with the memory card, and the system will associate the addresses one-to-one with individual ones of the one-touch inputs, enabling the user to operate one of the one-touch inputs to cause the device to place a call to the associated destination address.

2. The Internet radio device of claim 1 wherein the destination addresses are conventional PSTN telephone numbers.

3. The Internet radio device of claim 1 wherein the one-touch inputs comprises an array of buttons.

4. The Internet radio device of claim 1 wherein the one-touch inputs comprises a turnable dial.

5. The Internet radio device of claim 1 wherein the destination addresses includes one or more of names, telephone numbers, and IP addresses.

6. The Internet radio device of claim 1 wherein the information introduced by the memory card appears in a display window on the device when one of the indicia is selected and activated.

* * * * *